Inventors
H. Benmussa - J. P. Le Corre
By [signature]
Attorney

Inventors
H. Benmussa - J.P. Le Corre
By [signature]
Attorney

Inventors
H. Benmussa - J. P. Le Corre
By [signature]
Attorney

Inventors
H. Benmussa - J. P. Le Corre
By [signature]
Attorney

AUTOMATIC TELEPHONE SWITCHING SYSTEM

Inventors
H. Benmussa - J. P. Le Corre
By [signature]
Attorney

Sept. 11, 1962 H. BENMUSSA ET AL 3,053,935

AUTOMATIC TELEPHONE SWITCHING SYSTEM

Filed July 29, 1957 14 Sheets-Sheet 6

Inventors
H. Benmussa - J.P. Le Corre
By [signature]
Attorney

Inventors
H. Benmussa - J. P. Le Corre
By [signature]
Attorney

Inventors
H. Benmussa - J.P. Le Corre
By J. M. Calimafde
Attorney

AUTOMATIC TELEPHONE SWITCHING SYSTEM

Filed July 29, 1957

Inventors
H. Benmussa - J. P. Le Corre
By [signature]
Attorney

Sept. 11, 1962 H. BENMUSSA ET AL 3,053,935

AUTOMATIC TELEPHONE SWITCHING SYSTEM

Filed July 29, 1957 14 Sheets-Sheet 10

Inventors
H. Benmussa - J.P. Le Corre
By [signature]
Attorney

AUTOMATIC TELEPHONE SWITCHING SYSTEM

Filed July 29, 1957 14 Sheets-Sheet 11

Inventors
H. Benmussa - J. P. Le Corre
By [signature]
Attorney

Inventors
H.Benmussa - J.P. Le Corre
By [signature]
Attorney

Inventors
H. Benmussa - J.P. Le Corre
By [signature]
Attorney

AUTOMATIC TELEPHONE SWITCHING SYSTEM

Inventors
H. Benmussa - J. P. Le Corre
By J. Calimafde
Attorney

United States Patent Office 3,053,935
Patented Sept. 11, 1962

3,053,935

AUTOMATIC TELEPHONE SWITCHING SYSTEM

Henri Benmussa and Jean Pierre Le Corre, Paris, France, assignors to International Standard Electric Corporation, New York, N.Y., a corporation of Delaware Filed July 29, 1957, Ser. No. 674,662
Claims priority, application France July 31, 1956
9 Claims. (Cl. 179—18)

This invention refers to switching systems applicable particularly to automatic telephony. It refers more particularly to systems wherein the switching operations are performed by means of static devices using, for example, magnetic materials or asymmetric conductivity elements.

Switching circuits and particularly telephone switching circuits have already been described and designed that use only so-called static circuit elements, such as vacuum or gas-filled tubes, or asymmetric conductivity elements, vacuum diodes or diodes using semi-conductive materials. It is known that in such systems using vacuum tubes a great many of the failures are caused by variations in the characteristics of the tubes, whose life on the average is substantially shorter than that of the other components used.

Further, it is difficult to design vacuum tube circuits that can withstand hard mechanical blows, the tubes being always the weak link in such arrangements.

One of the objects of this invention is to provide a switching system applicable particularly to automatic telephony and wherein the switching systems properly so called, and particularly the electronic gates and the circuits having more than one stable condition, use only magnetic materials and asymmetric conductivity elements that are practically insensitive to wear and to mechanical blows.

The switching circuit covered by the invention uses a large number of bi-stable circuits, called "ferroresonant flip-flop circuits." Descriptions of such circuits will be found in technical literature and particularly in the review Electronics, in which appeared the following articles: "Ferroresonant Flip-Flops," by Carl Isborn, pages 121 to 123, April 1952, and "Ferroresonant Flip-Flop Design," by Rudolph W. Rutishauser, pages 152 and 153, May 1954.

The principle and the properties of ferroresonant flip-flop circuits will be recalled briefly for reference. When a magnetic-core coil L is connected in series with a condenser C and a source of alternating current, for a suitable dimensioning of the value of these elements and of the voltage supplied by generator G the circuit shows two conditions of electrical stability, corresponding respectively to a strong current and to a weak current in the circuit. When the circuit is in the stable condition corresponding to a strong current the magnetic core is saturated, so that the inductance of the coil is low, a large potential then appearing at the terminals of condenser C. In the other stable condition, corresponding to a weak current, the magnetic core is not saturated, the inductance of the coil is then high and a low potential appears at the terminals of condenser C. It is possible to obtain variations of the voltage at the terminals of the condenser in the ratio of 20 to 1. The output signal is generally taken at the terminals of condenser C through a transformer capable of supplying independent output signals by means of separate secondary windings. A ferroresonant flip-flop circuit such as used in the switching circuit covered by the invention will be described later on with reference to FIGS. 1A and 1B.

The telephone switching system covered by the invention is described in the rest of the description with reference to an automatic switchboard comprising only one switching stage. However, it could be provided with a larger number of stages (three, for example) without modifying its features, such an extension being clearly apparent to a man skilled in the art.

Each subscriber has access over his line circuit to each connecting circuit, hereinafter called a "connector," by means of one electronic gate for each connector circuit. The electronic gates used to connect line circuits to the same connector are each controlled by one stage of a circuit having $n+1$ stages ($n$ being the number of lines, the busy-tone generator being counted as one line and the $n+1$st stage being used to characterize the availability of the connector). All the connectors, four in the example considered later on, are controlled by an allotter circuit that successively tests the condition of each connector and by means of an electrical characteristic marks a free connector that will be used to handle the next call. This electrical characteristic is applied to the line circuits through the connector thus marked. In a connector, each marking circuit leading to a subscriber line circuit prepares the control of the stage associated with the electronic gate corresponding to that line circuit.

Register circuits are provided to receive from the calling subscriber, in the form of pulse trains, the information regarding the number of the called subscriber and then to control the connection of the calling to the called subscriber through a connector. Each register circuit has access to each connector through an eletronic gate, which is controlled by one stage of a circuit having $p+1$ stages designed so as to have $p+1$ stable conditions ($p$ being the number of connecting circuits, the $p+1$st stage being used to characterize the availability of the register). The register circuits are controlled by a register allotter circuit, which tests the register circuits and by means of an electrical characteristic marks a free register that will be used to handle the next call. Each register circuit has access to each line circuit through each connector. Each register circuit comprises means for sending the calling subscriber the dialing tone, means for receiving the information sent by the calling subscriber as pulse trains and means for decoding said information.

Connections are established as follows. Before any call, a connector and a register circuit are seized and they will be used to handle the next call. When a subscriber removes his handset, he causes the opening of an electronic gate in the line circuit. Coincidence between the opening of this electronic gate and the electrical marking characteristic applied from the connector allotter circuit through a connector causes the shifting into operating position of the stage of the $n+1$ stage circuit of the connector associated with the electronic gate controlling the connection of this line circuit to the connector. This electronic gate is thus opened and the subscriber is connected to the connector.

The $(n+1)$ stage circuit of the connector is so connected as to show $n+1$ stable conditions as the connector starts to operate, that is, so that only one stage can be in "operating" position at a time.

The connector is brought into calling condition with respect to the register circuit previously marked and the connection of the connector to the register is made the same way as the connection of the line circuit to the connector. The calling subscriber then receives the dialing tone, sent by the register, over the connector to which he is connected and he sends the called subscriber's number in the form of pulse trains. This information is decoded and stored in the register circuit, which uses it to determine the called subscriber's equipment code.

Means are provided in the connector to check that this circuit has been connected to the register circuit. This information is used to modify the operation of the connector's $n+1$ stage circuit so that two stages can simultaneously be in operating position, namely, the stages controlling the electronic gates respectively corresponding to to the calling and the called subscribers or possibly to the busy-tone source.

The register circuit then causes the shifting into operating position of the $n+1$ stage circuit stage corresponding to the called subscriber and the application of ringing tone to the called subscriber's line. The register circuit is then released and is available to handle another call. The ringing tone is applied to each subscriber line from a common generator through a normally-blocked electronic gate that is unblocked upon the coincidence of two conditions, namely, the opening of an electronic gate associated with this line circuit in a connector and the fact that the subscriber line is open, that is to say, that the called subscriber has not removed his handset. As soon as the called subscriber answers and removes his handset, the ringing electronic gate is blocked and the two subscribers are connected to each other. They are then connected symmetrically with respect to the connector.

In accordance with another feature of the invention, the $p+1$ stage circuits used to control $p$ electronic gates are $p+1$ ferroresonant flip-flop circuits supplied alternating current in parallel through a common condenser showing such impedance that only one ferroresonant flip-flop circuit can be in operating position at a time, that is to say, can carry a strong current.

In accordance with another feature of the invention, in such $p+1$ stage circuits means are provided to connect to the terminals of the common A.C. supply condenser a circuit whose impedance can assume two values, the dimensions of the elements being chosen so that these two values will be such as to allow only one ferroresonant flip-flop circuit to shift into operating position for one of the two values and two (or more than two) ferroresonant flip-circuits for the other value.

In accordance with another feature of the invention, each connecting-circuit or register-circuit allotter circuit comprises $m$ ferroresonant flip-flop circuits interconnected in a loop, the output of each flip-flop circuit being connected to the input of the next flip-flop circuit through an electronic gate controlled by the associated connector or register circuit, said electronic gate being designed so as to be blocked whenever the associated connector (or register circuit) is free and vice-versa, so that whenever all the connectors (or register circuits) are busy the allotter circuit will operate as a relaxation oscillator that will successively take its $m$ stable positions ($m$ being the number of connectors or of register circuits), the operation as an oscillator ceasing as soon as a ferroresonant flip-flip circuit associated with an electronic gate corresponding to a free connector or register circuit shifts into operating position.

In accordance with another feature of the invention, the registers have a common blocking circuit designed so that only one register at a time can control the establishment of a connection, the operation of the other registers being then held up until the connection has been established.

Other objects, features and advantages of this invention will appear from the following description of an embodiment example, said description being given with reference to the accompanying drawing, in which.

Figure 2:
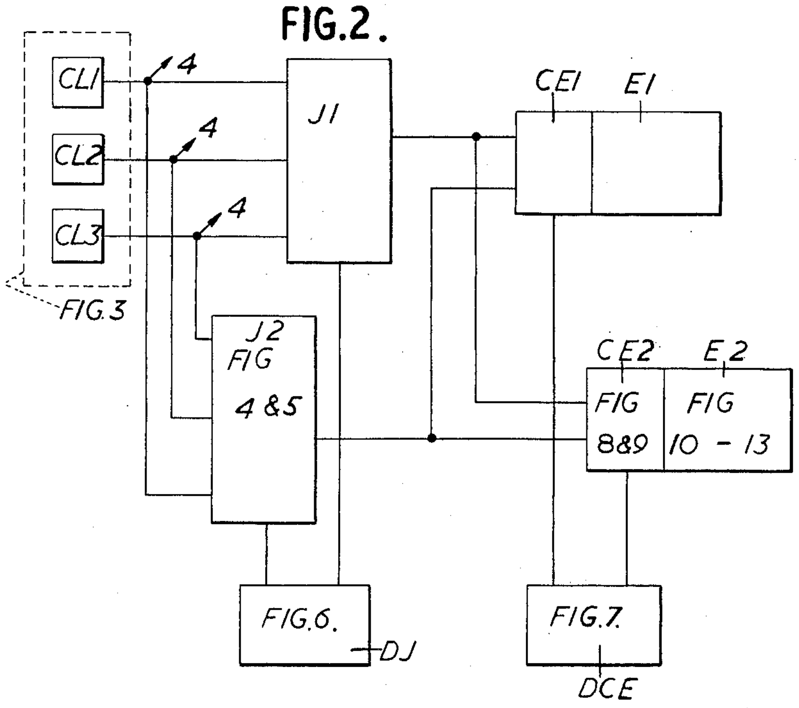
FIG. 2 shows the wiring diagram of a telephone switching system incorporating the invention, which is shown in detail in FIGS. 3 to 13.
Figure 15:
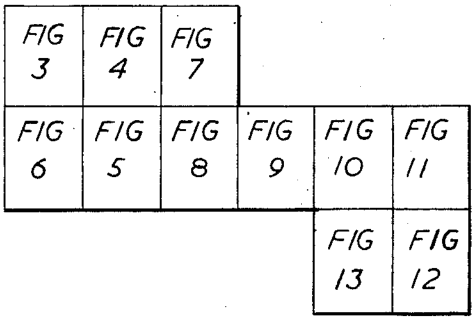
FIG. 15 shows how to associate FIGS. 3 to 14.

The operation of a telephone switching system incorporating features of the invention and shown in detail in FIGS. 3 to 14 will now be described with reference to FIG. 2. The system involved comprises 20 lines, 4 connector circuits and 2 registers. FIG. 2 shows 3 line circuits CL1, CL2 and CL3, which are multipled to the 4 connectors, as indicated by multipling arrows bearing the index 4, only two connectors being shown, namely, J1 and J2. Each register circuit E1 and E2 is associated with a register connector circuit, CE1 and CE2 respectively, and each connector circuit has access to the two register connectors. The connector allotter circuit DJ is associated with the four connectors and operates independently of any call, so as to mark a free connector circuit that will be used to handle the next call. As soon as a connector circuit, marked by allotter circuit DJ, is busied to handle a call, the allotter circuit marks another free connector circuit, which will be used to handle the next call; likewise, the register connector circuits mark, independently of any call, a register connector circuit and the associated register, which will be used to put through the next call. If a subscriber, CL1 for example, wishes to make a call, he is taken care of by the connector circuit, J1 for example, marked by allotter circuit DJ. Connector J1 then seizes the register marked by the associated allotter circuit DCE. The subscriber thereupon receives the dialing tone and dials the digits of the called subscriber's number. As soon as the register has received the called subscriber's number, the number of subscriber CL3 for example, it causes in connector circuit J1 the switchings required to establish the connection between subscribers CL1 and CL3. The register circuit is then released and can be marked by allotter circuit DCE to handle the next call. The conversation is then under the control of the connector to which the two subscribers are connected symmetrically and this connector will be released as soon as either of the two subscribers hangs up his handset.

FIGS. 3 to 14 and the establishment of a connection between two subscribers will now be described in detail.

Figure 1A:
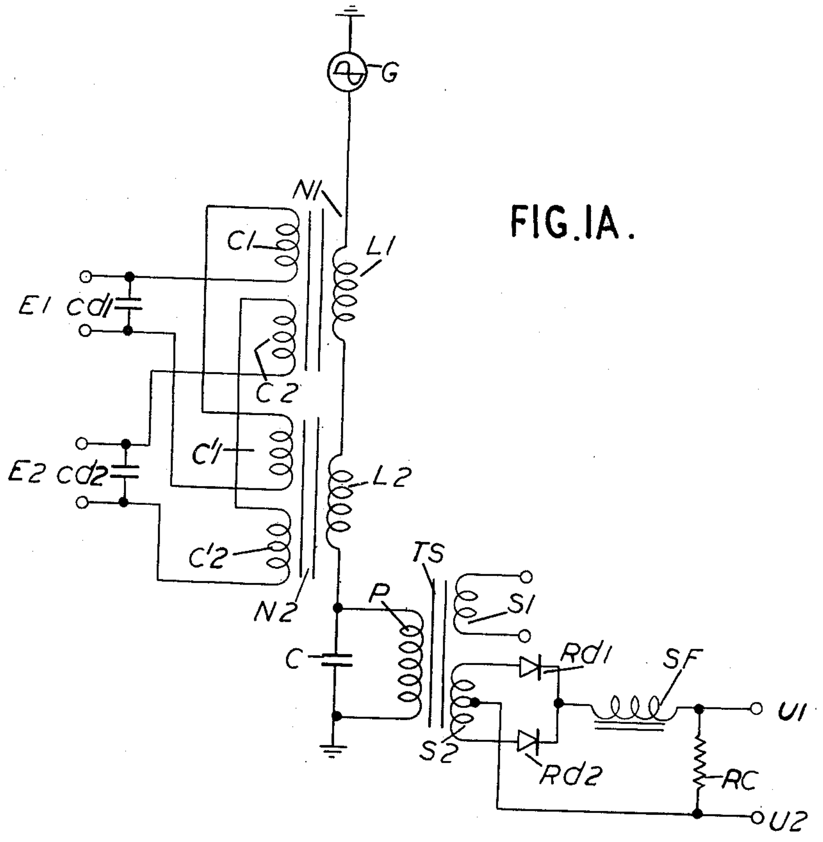
FIGS. 1A and 1B show respectively the circuit and a schematic of a ferroresonant flip-flop circuit.

FIG. 1A shows a ferroresonant flip-flop circuit wherein the coil in series with condenser C and A.C. generator G is made up of two windings L1 and L2 wound on two ferromagnetic cores N1 and N2, respectively. Generator G supplies alternating current of the order of 10 cycles. Each of magnetic cores N1 and N2 carries two control windings C1, C2 and C'1, C'2 respectively for magnetic cores N1 and N2. As shown in FIG. 1A, windings C1 and C'1 are connected in series but in opposition, so that the alternating currents induced in windings C1 and C'1 cancel each other; the same applies to control windings C2 and C'2. Terminals E1 and E2 to which are connected windings C1—C'1 and C2—C'2 respectively, are the control terminals. Decoupling condensers *cd*1 and *cd*2 are connected to terminals E1 and E2, respectively. The operation of such a circuit is identical with the operation of the ferroresonant flip-flop circuit described above; the sole purpose of dividing the windings and condensers *cd*1 and *cd*2 and of using magnetic cores is to prevent the appearance of alternating current in the D.C. control circuits, in accordance with a well-known method broadly applied in the design of magnetic amplifiers.

Figure 1B:
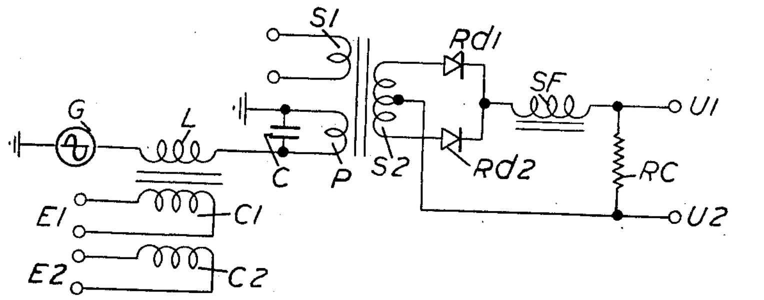

As already indicated above, depending upon the electrical stability condition in which the ferroresonant flip-flop circuit finds itself, the amplitude of the alternating voltage appearing at the terminals of condenser C can vary in the ratio of 1 to 20. The output voltage is taken from the terminals of condenser C through a transformer TS whose primary winding P is connected to the terminals of condenser C. Two secondary windings S1 and S2 are shown for transformer TS. Winding S2 supplies two diodes R*d*1 and R*d*2 and the rectified output voltage, filtered by coil SF, appears at terminals U1 and U2. A permanent load RC is connected between these two terminals. Of course, the output current in the form of direct current can be used after rectification or else direct use can be made of the alternating current appearing at the terminals of a secondary winding. Further, as many secondary windings as are necessary can be provided in order to obtain electrically independent output circuits. The shifting of the ferroresonant flip-flop circuit of FIG. 1A from one stable condition to the other is obtained by applying a D.C. pulse of suitable amplitude to one of the control windings. While only two control windings are shown, as many as are required may be provided, each winding being electrically independent of the rest. In FIGS. 3 to 14 the ferroresonant flip-flop circuit is shown in schematic form so as to simplify the drawing. FIG. 1B shows the method of representation used in the case of the flip-flop circuit of FIG. 1A. In these two figures, the same reference numbers are used for identical components. It will be noticed that only a single winding has been shown for coil L and for control circuits C1 and C2. This simplification has also been used for the magnetic amplifiers, which in the simplest case are shown as having one winding supplied alternating current and one or more control windings within a dot-dash box. To simplify the reading of the drawing, each magnetic amplifier carries a circle enclosing a "+" sign or a "—" sign depending upon whether the output winding or windings supply or not a voltage in the absence of control current. However, these simplifications will not make it hard to understand the description, since the magnetic amplifiers are well-known devices described many times over in technical literature.

Wherever the operation of a ferroresonant flip-flop circuit or of a magnetic amplifier is described in detail in the description, all its components are given a reference number. However, in the case of a chain of identical circuits, certain components always bear the same letter reference. For example, the diodes used to rectify the output alternating current of the flip-flop circuits or of the magnetic amplifiers are often denoted by the reference *dr* and the filtering coils by the reference SF. Likewise, to simplify the description, it has been decided to call "normal" position the stable condition of a ferroresonant flip-flop circuit corresponding to a weak current and "operating" position the one corresponding to a strong current.

*Connector Allotter Circuit (FIG. 6)*

Figure 6:
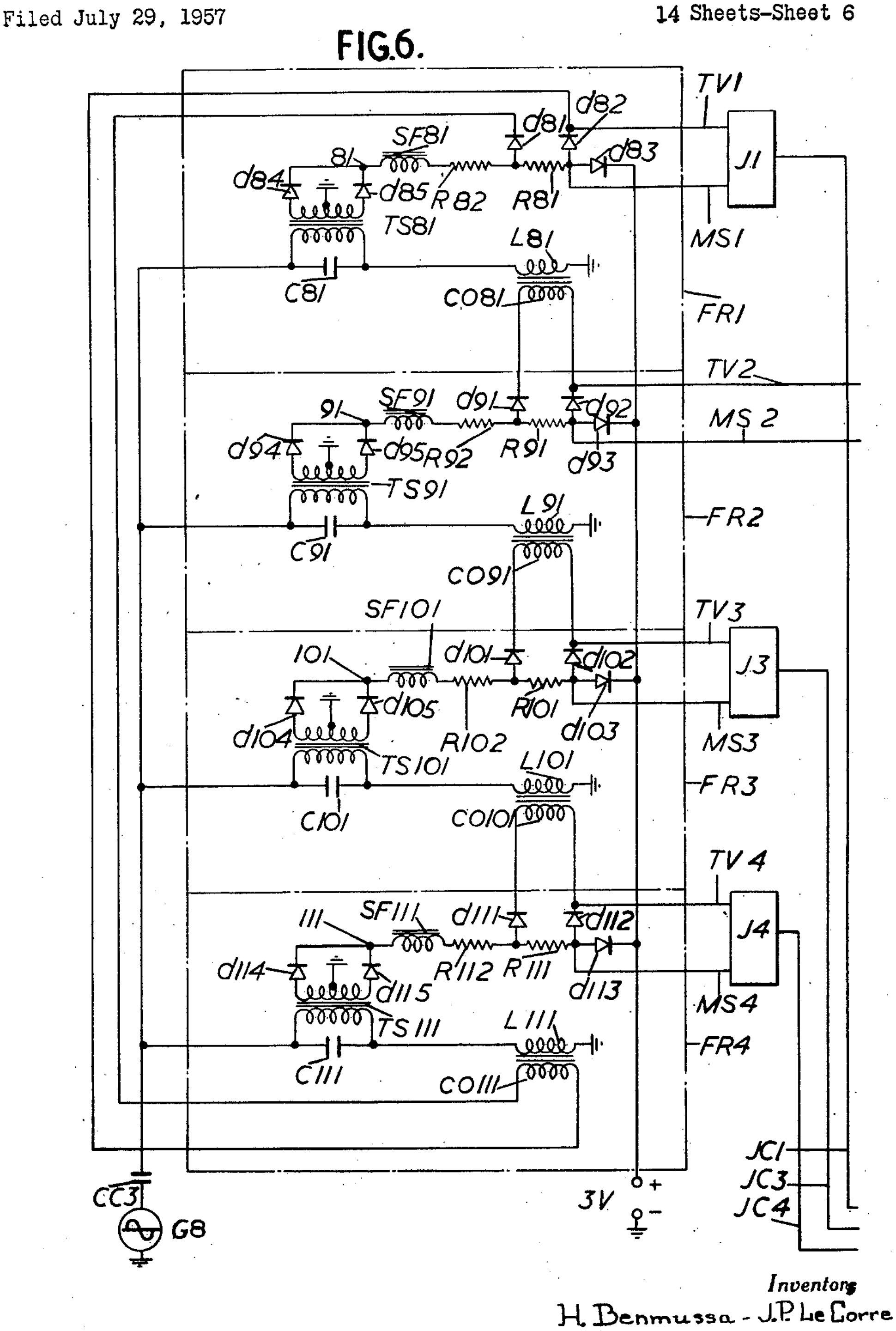
FIG. 6 shows a connector allotter circuit.

The connector allotter circuit shown in FIG. 6 is a four-stable-condition circuit made up of four ferroresonant flip-flop circuits FR1, FR2, FR3 and FR4, shown within dot-dash boxes. These four flip-flop circuits are interconnected in a loop and so that only one of them can remain in a stable condition corresponding to a strong current (operating position). Further, each connecting circuit between one flip-flop circuit and the next is designed so that the shifting of a flip-flop circuit from its weak-current condition to its strong-current condition will cause the flip-flopping of the next circuit in the chain after a predetermined delay. When the connector allotter circuit suffers no external action, it takes each of the four stable conditions in succession and functions as an operating circuit.

The ferroresonant flip-flop circuits used are all identical, so only circuit FR4 will be described. This circuit comprises coil L111, wound on a ferromagnetic core, which is connected in series with condenser C111. The four flip-flop circuits FR1–FR4 are supplied 8-kc. alternating current in parallel from generator G8 through common condenser CC3, whose role will be explained later. Generally, the 8-kc. A.C. generators are referenced G8 and the 50-kc. A.C. generators G50. A control winding *co*111 is provided on the same magnetic core as coil L111. Output transformer TS111 is connected to the terminals of condenser C111. The voltage appearing at the terminals of the secondary winding of transformer TS111 is rectified by diodes *d*114 and *d*115 and filtered by filtering coil SF111. The circuit is designed so that point 111 will be brought to a potential of +4.5 volts or to practically zero potential depending upon whether flip-flop circuit FR4 is in "operating" or in "normal" position and this voltage is used to control flip-flop circuit FR3 through control winding *co*101. Each flip-flop circuit such as FR4 (FIG. 6) is associated with a connector, as will be explained later.

Figure 3:
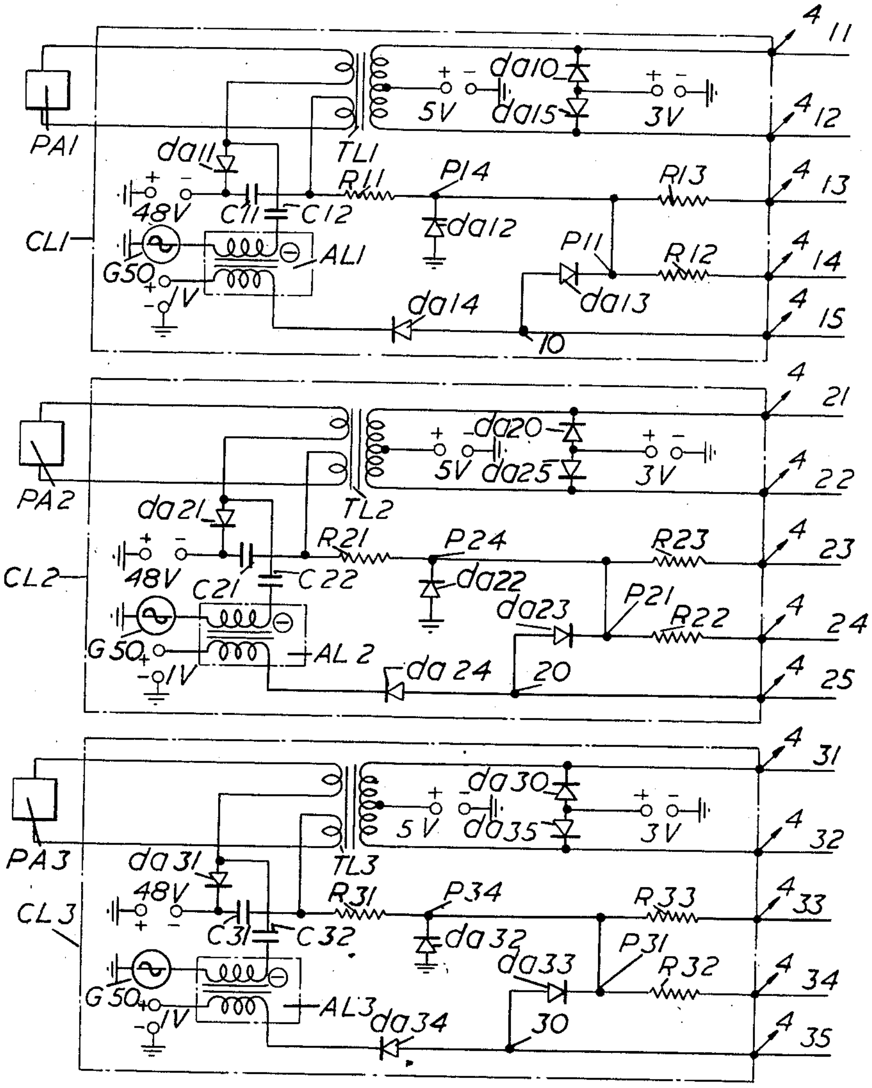
FIG. 3 shows 3 subscriber line circuits.
Figure 4:
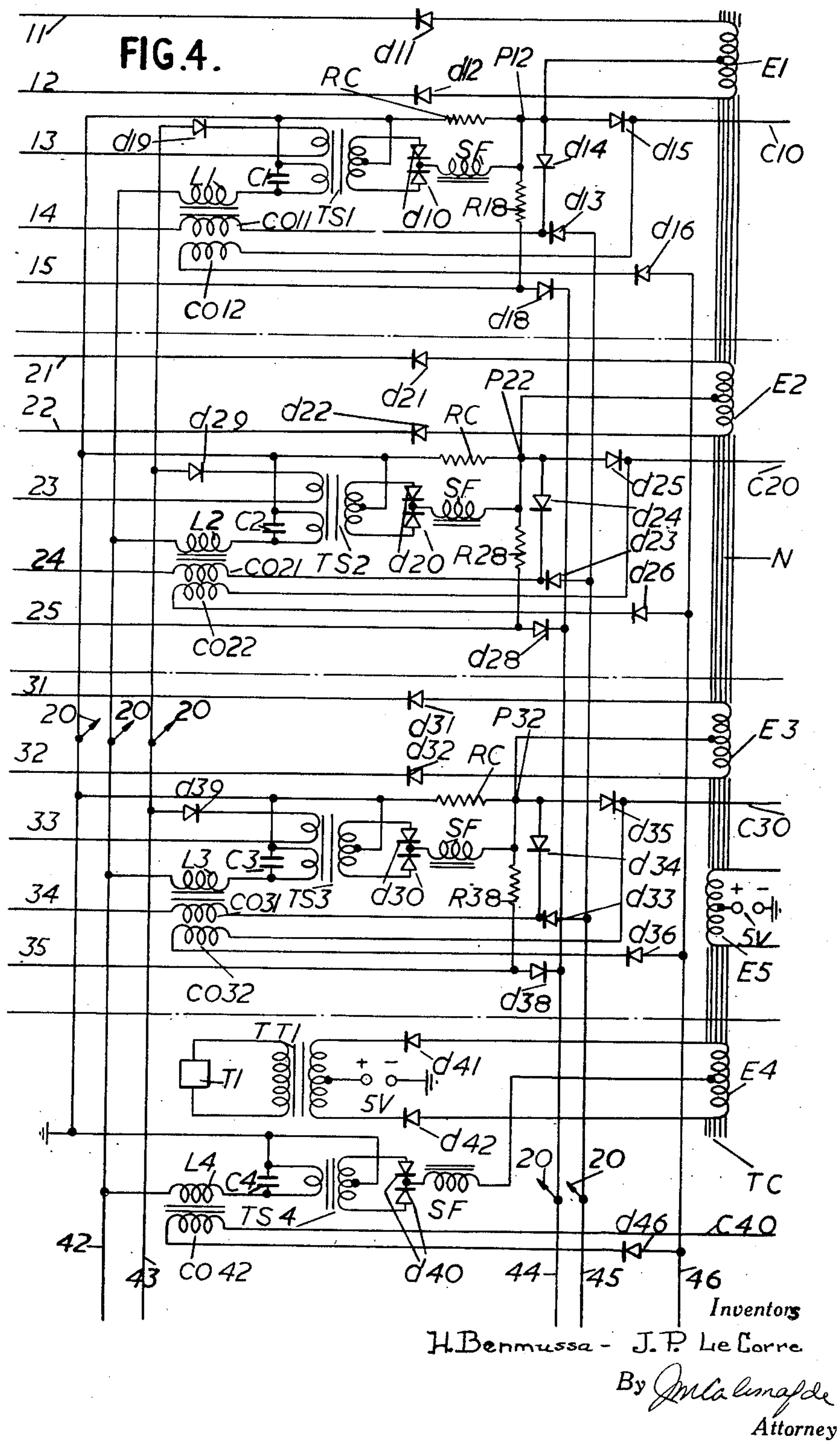
FIGS. 4 and 5 show a connector circuit.
Figure 5:
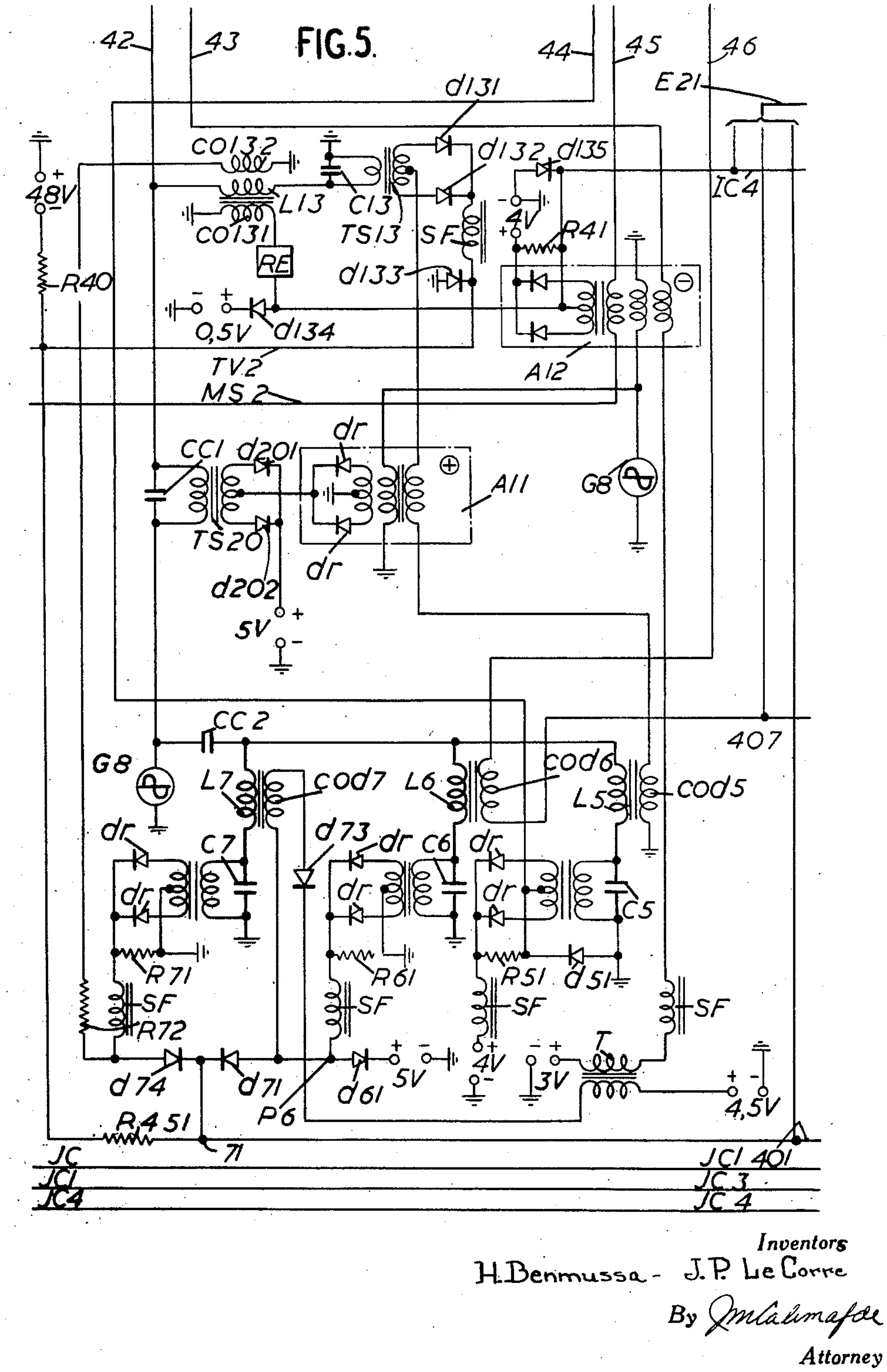

In the embodiment example shown in FIGS. 2 to 10 there are only four connectors J1, J2, J3 and J4, with which are respectively associated four flip-flop circuits FR1 . . . FR4 (FIG. 6). The connectors are all identical and FIGS. 4 and 5 show in detail only connector J2, associated with flip-flop circuit FR2 (FIG.6), connectors J1, J3 and J4 being shown schematically in FIG. 6. Each flip-flop circuit such as FR2 is connected to the corresponding connector by means of two conductors such as TV2 and MS2 in the case of circuit FR2. Conductor TV2 is used to send to the allotter circuit (FIG. 6), from the associated connector (FIGS. 4 and 5), information on the availability or the busy condition of this connector. As will appear later on, when the associated connector is free, conductor TV2 is brought to a potential of +5 volts and, when the connector is busy, conductor TV2 is brought to a negative potential very close to the ground potential, —.5 volt for example. Conductor MS2 will be used to send to connector J2 (FIGS. 4 and 5), from the allotter circuit (FIG. 6), a marking potential that will tell that the associated connector has been chosen to handle the next call.

The operation of the circuit will now be described under the assumption that conductors TV1, TV2, TV3 and TV4 are brought to a negative potential close to the ground potential (—.5 volt), that is to say, that the four connectors are busy.

To simplify, the operation of the circuit of FIG. 6 will be described at the moment flip-flop circuit FR4 shifts from its weak-current condition ("normal" position) to its strong-current condition ("operating" position). The voltage at the terminals of condenser C111 takes a high value as compared to the one it had before (the ratio of the two values is for example of the order of 1 to 10 or greater) and the rectification of the output voltage from the secondary winding of transformer TS111 brings point 111 to a potential (+4.5 volts, for example) very slightly below the potential that over conductor TV4 would characterize the availability of the associated connector (namely, +5 volts). Since, as has been assumed, conductor TV4 is at a negative potential close to the ground potential (—.5 volt), current flows over the following circuit: point 111 (+4.5 volts), resistance R112, diode *d*111, winding *co*101 of flip-flop circuit FR3, conductor TV4 (—.5 volt). The flowing of current in winding *co*101 causes flip-flop circuit FR3 to shift from the "normal" to the "operating" position. Common condenser CC3 in the 8-kc. A.C. supply circuit is designed to prevent two flip-flop circuits from shifting simultaneously into "operating" position, the potential difference at the terminals of the flip-flop circuits being then insufficient for two circuits to stay in that position. It follows that the shifting of circuit FR3 into "operating" position causes circuit FR4 to return to the "normal" position.

The operation is repeated then, each flip-flop circuit causing the flip-flopping of the next circuit so that the circuit was in operation, although it should be clearly four stable positions in succession. Flip-flop circuit FR1 causes the flip-flopping of circuit FR4, thus replacing the allotter circuit under the initial conditions.

To simplify the description it will be assumed that the circuit was in operation, although it should be clearly understood that such a circuit is self-starting. In fact, as soon as voltage is applied to the circuit of FIG. 6, one of the flip-flop circuits FR1 . . . FR4 shifts into "operating" position because of slight differences existing between the circuits and, after a certain delay, this causes the shifting into "operating" position of the next circuit and so forth. The delay between the shifting of one circuit into "operating" position and the shifting of the next circuit is determined by the characteristics of the circuits, such as the inductance of the control winding or of the coil of the ferroresonant circuit properly so called. A delay circuit could be connected between each ferroresonant flip-flop circuit and the next; however, in the case here under consideration, the constants existing by design in each ferroresonant flip-flop circuit being sufficient, such added delay has not been necessary. In the embodiment example here involved, each ferroresonant flip-flop circuit remains in "operating" position approximately 8 cycles of the 8-kc. carrier current, or approximately 1 millisecond.

To summarize, in case the four associated connectors are busy, the allotter circuit of FIG. 6 operates as a relaxation oscillator and assumes its four stable conditions in succession.

It will be assumed now that connector J2 (FIGS. 4 and 5) associated with ferroresonant circuit FR2 (FIG. 6) is free, in which case conductor TV2 is brought to a potential of +5 volts. Under these conditions, when flip-flop circuit FR2 shifts into "operating" position, the control circuit of the next flip-flop circuit (FR1) is blocked by diode *d*91, whose cathode is brought to +5 volts and whose anode is brought to +4.5 volts. The operation of the circuit of FIG. 6 as a relaxation oscillator ceases, flip-flop circuit FR2 remaining in "operating" position. When a number of connectors are available, in which case a number of conductors TV1 . . . TV4 are brought to a potential of +5 volts, the circuit of FIG. 6 stops hunting as soon as one of the flip-flop circuits FR1 . . . FR4, corresponding to one of the conductors TV1 . . . TV4 brought to a potential of +5 volts, shifts into "operating" position. The circuit therefore operates as a finder and the hunting stops as soon as a free connector is found. The information that a free connector has been chosen to handle the next call is sent back to this connector over the corresponding one of conductors MS1 . . . MS4 by bringing that conductor to a potential of +3 volts obtained from point 91 brought to +4.5 volts. Diode *d*93, as well as the corresponding diodes (*d*83, *d*103 and *d*113) of the other flip-flop circuits, are connected to a +3-volt potential source, so that the potential of conductor MS2 is limited to +3 volts, a potential that tells that the associated connector has been chosen to handle the next call. Diodes such as *d*82, *d*92, *d*102 and *d*112 have the effect of preventing a momenatry positive potential from appearing on conductors MS1 . . . MS4 when in the course of hunting the associated flip-flop circuit shifts into "operating" position while the corresponding connector is busy and the associated conductor TV2 . . . TV4 is brought to a negative potential close to the ground potential (—.5 volt); conductors MS1 . . . MS4 are held at ground potential owing to the presence of these rectifiers. Resistances R82, R92, R102 and R112 are current-limiting resistances that act while in the course of hunting the associated flip-flop circuit shifts into "operating" position while the associated connector is busy, that is to say, while conductor TV1 . . . TV4 is brought to 0-volt potential. Resistances R81, R91, R101 and R111 limit the current in diodes *d*83, *d*93, *d*103 and *d*113, respectively.

*Connector Circuit J2 (FIGS 4 and 5)*

The connector (J2) shown in FIGS. 4 and 5 will now be described. This connector comprises a transformer TC whose core is shown at N (FIG. 4) and which comprises as many windings as there are subscribers connected to this connector, plus a winding (E4) for sending the busy tone and a winding (E5) for the connection of the registers. FIG. 4 shows only three windings, E1, E2 and E3, corresponding to subscriber line circuits CL1, CL2 and CL3 (FIG. 3). With each winding such as E1 is associated an electronic gate consisting of two diodes, *d*11 and *d*12, and a ferroresonant flip-flop circuit, E1—C1. FIG. 4 shows four flip-flop circuits, L1—C1, L2—C2, L3—C3 and L4—C4, corresponding to the three subscriber line circuits shown and to the busy-tone circuit. Twenty subscribers are connected to the connector in this particular embodiment example; however, since they are all connected in exactly the same manner, only three circuits are shown. Each flip-flop circuit, such as L1—C1, comprises in addition two control windings *co*11 and *co*12, on the same core as coil L1 and transformer TS1, whose primary winding is connected to the terminals of condenser C1. This transformer comprises two secondary windings, shown to the right and to the left of the core. All the flip-flop circuits are supplied 8-kc. alternating current in parallel from generator G8 (FIG. 5) through common condenser CC1 (FIG. 5), the value of this condenser being chosen so that only one flip-flop circuit can remain in "operating" position, corresponding to a strong current, as has already been explained with reference to FIG. 6; flip-flop circuit L13—C13 (FIG. 5) is connected in parallel to the 8-kc. A.C. supply circuit together with those controling the subscribers' electronic gates. When it is in "operating" position, flip-flop circuit L13—C13 (FIG. 5) characterizes the availability of the connector. Three other flip-flop circuits, L5—C5, L6—C6 and L7—C7, shown in the lower portion of FIG. 5, make up a three-stable-condition meter used to characterize the various stages of operation of the connector. These three flip-flop circuits are supplied 8-kc. alternating current from generator G8 through common condenser CC2 so that only one of these flip-flop circuits can remain in "operating" position.

*Subscriber Line Circuits*

Three identical subscriber line circuits, CL1, CL2 and CL3, are shown in FIG. 3, within dot-dash boxes. Each subscriber line circuit, such as CL1, comprises a line transformer TL1 having two primary windings, used for connecting the subscriber line and supplying it alternating current, and one secondary winding, whose midpoint is brought to a potential of +5 volts. The supply circuit of the subscriber's station, which is a classical station, is as follows: a negative terminal of a battery, of 48 volts for example, diode *da*11, upper primary winding of transformer TL1, subscriber station PA1, lower primary winding of transformer TL1, resistance R11, whose value may be of the order of 700 ohms for example, diode *da*12, positive terminal of the 48-volt supply battery grounded. It will be understood that when the subscriber station's handset is in place, that is to say, when the line is open, no current flows through the circuit and diode *da*12 shows high impedance between the ground and point P14, which is held at a positive potential by conductor 14 (FIGS. 4 and 5), which is normally brought to a potential of +3 volts, as will appear later on. When the subscriber station's handset is removed, the station's supply current through diode *da*12 brings the cathode of this diode to a potential that is slightly negative with respect to ground. Point P14 then appears as a negative potential source of low internal resistance. In the case under consideration, point P14 is brought to a potential close to —.5 volt and diode *da*12 shows an impedance of the order of 10 ohms. Under these conditions, if the resistances such as R13 and R12 are of sufficiently large value with respect to the impedance of diode *da*12, a current appears and flows through these resistances when their right-hand end is brought to a slightly positive potential, of the order of a few volts, for example, without substantially modifying the potential of point P14. This arrangement therefore constitutes an electronic gate that allows current to flow through resistances R12 and R13 when the subscriber's handset is removed. This type of electronic gate is used many times in the telephone switching system shown in FIGS. 3 to 14. Each subscriber line circuit also comprises a magnetic amplifier, shown schematically at AL1 in the case of line circuit CL1, which is used to apply the ringing current to the called subscriber's line. All the output conductors of the subscriber lines are multipled to the four connectors, as shown by arrows bearing the index 4. The diodes such as *da*10 and *da*15 in line circuit CL1 (FIG. 3) are clipping diodes designed to limit the amplitude of the speech signals to 2 volts so that these signals will be unable to act on the blocking of the diodes such as *d*11 and *d*12 (FIG. 4).

*Operation of Connector J2 (FIGS. 4 and 5)*

When connector J2 of FIGS. 4 and 5 is available, flip-flop circuit L13—C13 (FIG. 5) is in "operating" position, so that the secondary winding of the associated transformer TS13 supplies a voltage that is rectified by diodes *d*131 and *d*132 and filtered by coil SF. The dimensions of these circuit elements are so chosen that the cathode of diode *d*133 will show a potential of the order of +5 volts, so that this diode is blocked and the conductor TV2 connected to the connector allotter circuit (FIG. 6) is brought to a potential of +5 volts, which characterizes the availability of the connector. When connector J2 (FIGS 4 and 5) is busy, flip-flop circuit L13—C13 is in "normal" position, so that no potential will appear at the cathode of diode *d*133. Current flows then from the negative terminal of a 48-volt battery, whose positive terminal is grounded, through resistance R40 and the diode *d*133 whose cathode is connected to conductor TV2 is then brought to a negative potential close to the ground potential, —.5 volt for example. This arrangement constitutes an electronic gate of the same type as described with reference to line circuit CL1 (FIG. 3). This potential of —.5 volt to which conductor TV2 is brought characterizes the busy condition of the connector with respect to the allotter circuit (FIG. 6). At A12 is shown schematically a magnetic amplifier comprising from right to left a first control winding, an 8-kc. A.C. supply winding, a second control winding and an output winding. This magnetic amplifier, which may for example be of the self-saturation type, is blocked by means of a saturation winding (not shown) when the circuit is in normal condition, that is to say, when the amplifier suffers no external action and, in this case, practically no voltage appears at the terminals of its output winding. This characteristic is indicated by the "—" sign within a circle. Current then flows through the following circuit: positive terminal of the 4-volt battery, whose negative terminal is grounded, resistance R41, delay circuit RE, whose resistance is practically negligible, control winding *co*131 of flip-flop circuit L13—C13, ground. This delay element may take any form whatever and in particular may in known manner consist of a circuit making use of the properties of rectangular hysteresis cycle magnetic circuits. The delay element and control winding *co*131 show practically negligible resistance and diode *d*134, whose cathode is biased to a potential of +.5 volt, is blocked and shows a high impedance. Diode *d*135, whose cathode is brought to a very slight positive potential, is blocked and also shows a high impedance. The current flowing through winding *co*131 allows blocking flip-flop circuit L13—C13 (FIG. 5) in "operating" position, which characterizes the availability of the connector (FIGS. 4 and 5). The rectified output current of flip-flop circuit L13—C13, which is used to bring conductor TV2 to +5 volts, as has been explained above, is also used to block amplifier A11 and to keep in "operating" position the flip-flop circuit L5—C5 (FIG. 5) of the metering circuit shown in the lower portion of FIG. 5, which in that position characterizes the normal condition and the beginning of the operation up to the testing of the called subscriber, as will later be explained.

It will now be assumed that the connector J2 shown in FIGS. 4 and 5 is available, that is to say, that conductor TV2 is brought to +5 volts and, further, that the connector allotter circuit (FIG. 6) has chosen this connector to handle the next call, this marking being obtained by bringing conductor MS2 to a potential of +3 volts from the connector allotter circuit (FIG. 6).

The +3 volt potential supplied by the allotter circuit (FIG. 6) to conductor MS2 is applied through connector J2 (FIGS. 4 and 5) to each of the line circuits (FIG. 3). For example, in the case of line circuit CL1 (FIG. 3) the marking circuit is as follows: conductor MS2 (FIGS. 6 and 5), second control winding of amplifier A12 (FIG. 5), conductor 45 (FIGS. 5 and 4) (this portion of the circuit being common to all the line circuits), diode *d*13, control winding *co*11 of flip-flop circuit L1—C1, conductor 14 (FIGS. 4 and 3), resistance R12 (of the order of 1000 ohms), point P14 common to diode *da*12 and to resistance R11. The corresponding circuits for line circuits CL2 and CL3 start from conductor 45 and are similar to the one just described, a +3-volt potential being thus applied to the cathodes of diodes *da*22 and *da*32 (FIG. 3). When the line circuit is in normal condition, diode *da*12 is blocked by the +3-volt potential thus applied to its cathode.

The circuit is in this condition whenever there is no call, that is to say, whenever the connector allotter circuit (FIG. 6) has chosen a free connector through which it applies a +3-volt potential to each of the line circuits.

*Connection of the Calling Subscriber to a Register*

It will be assumed for example that subscriber CL2 has removed his handset in order to make a call, in which case current will flow through the primary windings of transformer TL2 as also through resistance R21 and diode *da*22. In the case of a classical telephone station, this current is of the order of 60 ma. As has been explained, point P24 is brought to a slightly negative potential, —.5 volt for example, and current can flow in the marking circuit as from conductor MS2 (FIG. 6) brought to a potential of +3 volts as has just been described. Of course, resistance R22 (FIG. 3) is designed so that this current will be much weaker (of the order of 2 ma.) than the transmitter current, so that it will practically not modify the potential of point P24. The flowing of current in the marking circuit causes, through the second winding of amplifier A12 (FIG. 5), the unblocking of this amplifier, which then supplies to the terminals of resistance R41 a voltage slightly higher than 4 volts, 5 volts for example, in opposition to the 4 volts from the biasing source. The current ceases in winding *co*131 of the flip-flop circuit L13—C13 characterizing the availability of the connector circuit, so that this circuit will be able to leave the "operating" position, as will later be explained. The cathode of diode *d*135, connected to conductor IC4 (FIGS. 5 and 8), is thus brought to a negative potential and this diode shows a low impedance.

The current flowing through conductor 45 (FIGS. 4 and 5) and diode *d*23 (FIG. 4) crosses control winding *co*21 of the flip-flop circuit L2—C2 (FIG. 4) associated with line circuit CL2 (FIG. 3). This flip-flop circuit, which was in "normal" position, shifts to its "operating" position, thus causing flip-flop circuit L13—C13 (FIG. 5) to return to normal owing to the presence of common condenser CC1 (FIG. 5) in the 8-kc. A.C. supply circuit. Owing to the shifting of flip-flop circuit L2—C2 into "operating" position, an 8-kc. alternating voltage appears at the terminals of the secondary winding of transformer TS2 and this voltage, rectified by diodes *d*20 and filtered, supplies a direct voltage of the order of 6 volts to the terminals of resistance RC, point P22 being thus brought to a potential of +6 volts with respect to ground. As has already been explained, the secondary winding of line transformer TL2 (FIG. 3) of line circuit CL2 (FIG. 3) is connected by conductors 21 and 22 (FIGS.

3 and 4) to both ends of winding E2 of transformer TC of connector J2 through two diodes, *d*21 and *d*22. The midpoint of the secondary winding of transformer TL2 is brought to a potential of +5 volts, while the midpoint of winding E2 of the transformer of the connector is connected to point P22. When flip-flop circuit L2—C2 is in normal, point P22 is at ground potential. Diodes *d*21 and *d*22, blocked by the +5-volt potential to which the midpoint of the secondary winding of transformer TL2 (FIG. 3) is brought, show a high impedance and constitute a blocked electronic gate. When the +6 volt potential appears at point P22, diodes *d*21 and *d*22 show a low impedance, so that the electronic gate they constitute together with the windings of transformers TL2 (FIG. 3) and TC (FIG. 4) is unblocked. Such electronic gates are well known in the art. Further, the +6-volt potential appearing at point P22 is applied by diode *d*24 to conductor 24 (FIGS. 3 and 4) through winding *co*21. This +6-volt potential causes current to flow in winding *co*21, thus bringing conductor 24 to a positive potential that will prevent the seizure of calling line circuit CL2 by a free connector whenever the latter has been marked by the connector allotter circuit to handle the next call.

Owing to the return to normal of flip-flop circuit L13—C13 (FIG. 5) the +5-volt potential applied to conductor TV2 and characterizing the availability of connector J2 disappears, so that current can flow from the negative terminal of the 48-volt battery through resistance R40 and diode *d*133, which then shows a low impedance and brings conductor TV2 to a negative potential very close to ground potential, —.5 volt for example. As has been explained with reference to the operation of the allotter circuit (FIG. 6), the +5-volt potential applied to conductor TV2 blocks the operation of the circuit of FIG. 6 as an oscillator, so that this circuit remains in the position in which flip-flop circuit L91—C91 (FIG. 6) is in "operating" position. Owing to the disappearance of the +5-volt potential from conductor TV2, current flows in winding *co*81 of flip-flop circuit FR1 (FIG. 6), causing this circuit to shift into "operating" position. Flip-flop circuit L91—C91 returns to "normal" position owing to the presence of common condenser CC3 (FIG. 6) in the 8-kc. A.C. supply circuit and the allotter circuit of FIG. 6 again operates as a finder. If it finds a free connector, it chooses it to handle the next call, in accordance with a method identical with the one described with reference to the choosing of the connector J2 (FIGS. 4 and 5) associated with flip-flop circuit L91—C91 (FIG. 6).

The return to normal of flip-flop circuit L91—C91 (FIG. 6) suppresses the +3-volt potential applied to the line circuits through conductor MS2 and connector J2 (FIGS. 4 and 5). It has already been explained how the output voltage of flip-flop circuit L2—C2 (FIG. 4) is used to keep conductor 24 at a positive potential and thus busy line circuit CL2. Upon the removal of the +3-volt potential from conductor MS2, the unblocking current crossing the left-hand control winding of amplifier A12 (FIG. 5) is suppressed. However, amplifier A12 is held blocked by the right-hand control winding, which is suplied by the following guard circuit: left-hand secondary winding of output transformer TS2 of flip-flop circuit L2—C2 (FIG. 4), one end of which is connected to point P24 (FIG. 3) brought to a potential of the order of —.5 volt, diode *d*29, conductor 43 (FIGS. 4 and 5), left-hand control winding of amplifier A12, coil SF, primary winding of transformer T, negative terminal of a biasing battery of +3 volts. This biasing voltage has the effect of blocking diode *d*29 (FIG. 5) or the similar diodes in the other gate circuits through which current would flow when point P24 or the similar points of other line circuits are brought to a negative potential. It will be understood that resistances R22 and R23 are designed so that the sum of the currents flowing through them will be substantially less than the supply current of the subscriber station and consequently will not substantially modify the potential of point P24 (FIG. 3).

As has already been explained, the shifting into "operating" position of the flip-flop circuit L2—C2 associated with line circuit CL2 causes flip-flop circuit L13—C13 to return to normal. When the connector (FIGS. 4 and 5) is in waiting positon, the output current of the secondary winding of transformer TS13 of flip-flop circuit L13—C13 flows through a control winding of magnetic amplifier A11 and through control winding *co*15 of the first flip-flop circuit L5—C5 of the metering chain shown in the lower portion of FIG. 5. Magnetic amplifier A11 (FIG. 5), which is supplied 8-kc. alternating current, is normally blocked by the flowing of the rectified output current of transformer TS13. When this current ceases owing to the shifting of flip-flop circuit L13—C13 (FIG. 5) into "normal" position, amplifier A11 is unblocked and supplies a current that, after rectification, flows through diodes *d*201 and *d*202, connected to the two ends of the secondary winding of transformer TS20, which then shows a low impedance. The primary winding of transformer TS20 is connected to the terminals of common condenser CC1, which is connected in series in the supply circuit of all the electronic gate control flip-flop circuits and the function of which is to prevent a number of circuits from remaining in "operating" position simultaneously. When amplifier A11 is blocked, diodes *d*201 and *d*202 show a high impedance owing to the fact that their cathode is connected to the positive terminal of a +5-volt biasing source, the negative terminal of which is grounded, and the primary winding then shows a high impedance at the terminals of condenser CC1. When amplifier A11 is unblocked, it supplies a potential sufficient to cancel the biasing applied to diodes *d*201 and *d*202, which then show a low impedance, so that the primary winding of transformer TS20 shows a low impedance at the terminals of common condenser CC1, thereby canceling the effect of condenser CC1. Under these conditions, several flip-flop circuits supplied by means of the circuit comprising condenser CC1 in series can remain in "operating" position simultaneously. It will be understood that the dimensions of the circuits can be chosen so that the overall impedance shown by condenser CC1 and transformer TS20 in parallel will allow two or more flip-flop circuits to shift into "operating" position when diodes *d*201 and *d*202 are unblocked. In the particular case here under consideration, the dimensions have been chosen so that only two flip-flop circuits can remain in "operating" position simultaneously, namely: the one belonging to the calling subscriber and the one belonging to the called subscriber. This possibilty of turning on two flip-flop circuits simultaneously is not used immediately but it will allow the register to cause the called subscriber's flip-flop circuit to shift into "operating" position as soon as it has received the calling subscriber's number.

In other words, when subscriber CL2 removes his handset, amplifier A12 is unblocked by a current flowing in the following circuit: conductor MS2 brought to a potential of +3 volts by the allotter circuit (FIG. 6), left-hand control winding of amplifier A12, conductor 45 (FIGS. 5 and 4), diode *d*23, control winding *co*21 of flip-flop circuit L2—C2, conductor 24 (FIGS. 4 and 3), resistance R22, point P24 brought to —.5 volt with respect to ground owing to the flowing of the subscriber station's supply current through diode *da*22. This current also causes the shifting into "operating" position of flip-flop circuit L2—C2 (FIG. 5), which in turn brings about the return to "normal" position of flip-flop circuit L13—C13, which then unblocks amplifier A11. Further, the output current of the secondary winding of transformer TS2 (FIG. 4) is used after rectification to hold amplifier A12 (FIG. 5) unblocked. At this stage of the operation of the circuit, all the devices that have left "normal" position in the connector are under the control of the calling subscriber: amplifier A12 is held unblocked by the guard circuit that has just been described and that is supplied by the left-hand secondary winding of transformer TS2 (FIG. 4); flip-flop circuit L2—C2 is in "operating" position and current flows in the following circuit: point P22 brought to +6 volts, diode *d*24, winding *co*21, conductor 24 (FIGS. 4 and 3), resistance R22, point P24 brought to —.5 volt. The two circuits that have just been described have in common point P24 of the calling subscriber's line circuit, which is brought to —.5 volt owing to the flowing of the subscriber station's supply current through diode *da*22. The supply current being of the order of 60 ma., and the sum of the currents in the two circuits that have just been described being of the order of a few milliamperes, the potential of point P24 is practically constant and equal to —.5 volt. If the calling subscriber hangs up, the transmitter current ceases and diode *da*22 shows a high impedance owing to the fact that conductors 23 and 24 are at positive potentials with respect to ground. The current therefore ceases in both circuits and magnetic amplifier A12 (FIG. 5) returns to "normal" position. Current can then flow from the 4-volt biasing battery through control winding *co*131 of flip-flop circuit L13—C13, which shifts into "operating" position. Its output current blocks amplifier A11, transformer TS20 again showing a high impedance at the terminals of common condenser CC1, which causes flip-flop circuit L2—C2 to return to normal. The output potential of transformer TS13 (FIG. 5) is then used, after rectification, to bring conductor TV2 to a potential of the order of 5 volts, this characterizing, as seen from the allotter circuit (FIG. 6), the availability of the connector.

*Register Allotter Circuit*

Figure 7:
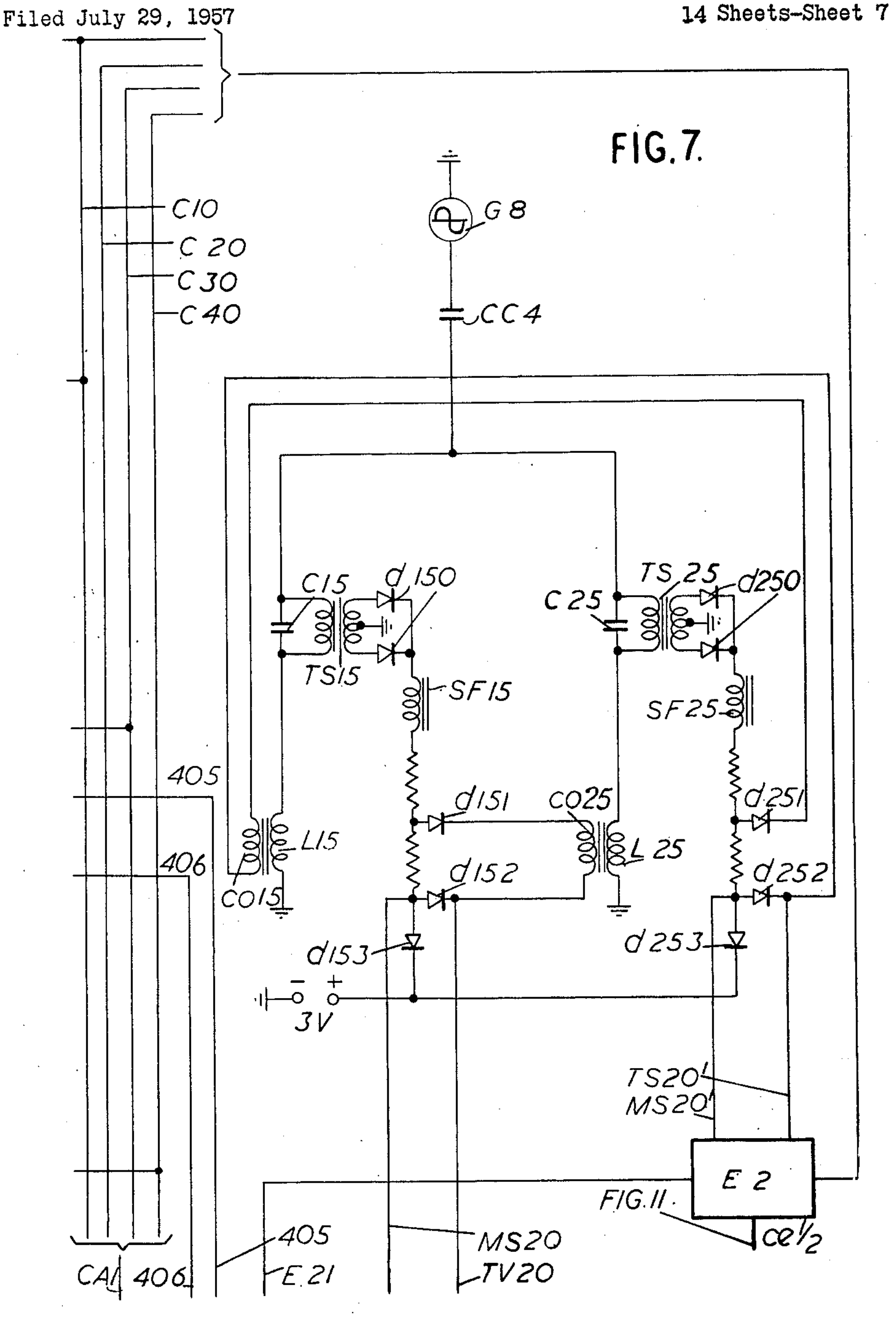
FIG. 7 shows a register allotter circuit.

FIG. 7 shows a register allotter circuit. The embodiment example under consideration comprises only two registers, only one of these registers being shown in FIGS. 8, 9, 10, 11, 12 and 13.

Each register comprises a register connector (FIGS. 8 and 9), through which the register properly so called (FIGS. 10 to 13) can be connected to any one of connectors J1 to J4. Generally, the register connector circuit operates the same way as a connector circuit, such as J1 . . . J4. It comprises a common transformer TCE (FIG. 9) having a winding E30 to E60 connected to each of connectors J1 to J4 and a winding E15 connected to the associated register (FIGS. 10 and 11). With each winding E30, E40, E50 and E60 of transformer TCE (FIG. 9) is associated a ferroresonant flip-flop circuit, respectively L30—C30, L40—C40, L50—C50 and L60—C60. The register connector (FIGS. 8 and 9) further comprises a flip-flop circuit L20—C20 that when in "operating" position characterizes the availability of the register (FIGS. 8 to 11). These five flip-flop circuits are supplied 8-kc. current in parallel through a common condenser CC5 so that only one of these circuits can remain in "operating" position. The register connector further comprises a magnetic amplifier A20 having four control windings *co*30, *co*40, *co*50 and *co*60 and which is unblocked when the circuit is in normal, so that a voltage appears at the terminals of the output winding that is rectified by diode *dr*200 and filtered by coil SF, causing current to flow through control winding *co*201 of flip-flop circuit L20—C20, which is thus blocked in "operating" position. Further, when flip-flop circuit L20—C20 is in "operating" position, the voltage appearing at the terminals of the secondary winding of transformer TS20 is rectified and filtered and conductor TV20 is brought to a potential close to 5 volts. This conductor TV20 (FIGS. 7 and 8) performs with respect to the register allotter circuit (FIG. 7) the same function as conductor TV2 (FIGS. 5 and 6) with respect to the connector allotter circuit (FIG. 3) and when brought to a potential of +5 volts characterizes the availability of the associated register.

The register allotter circuit shown in FIG. 7 is in all respects identical with and operates the same way as the connector allotter circuit (FIG. 6), except that it comprises two stages instead of four. It will be understood, from the explanation given with reference to FIG. 6, that in the absence of any external action this circuit assumes its two stable conditions in succession and operates as a relaxation oscillator. For a description of its operation, reference may be had to the description given in connection with FIG. 6.

Figure 8:
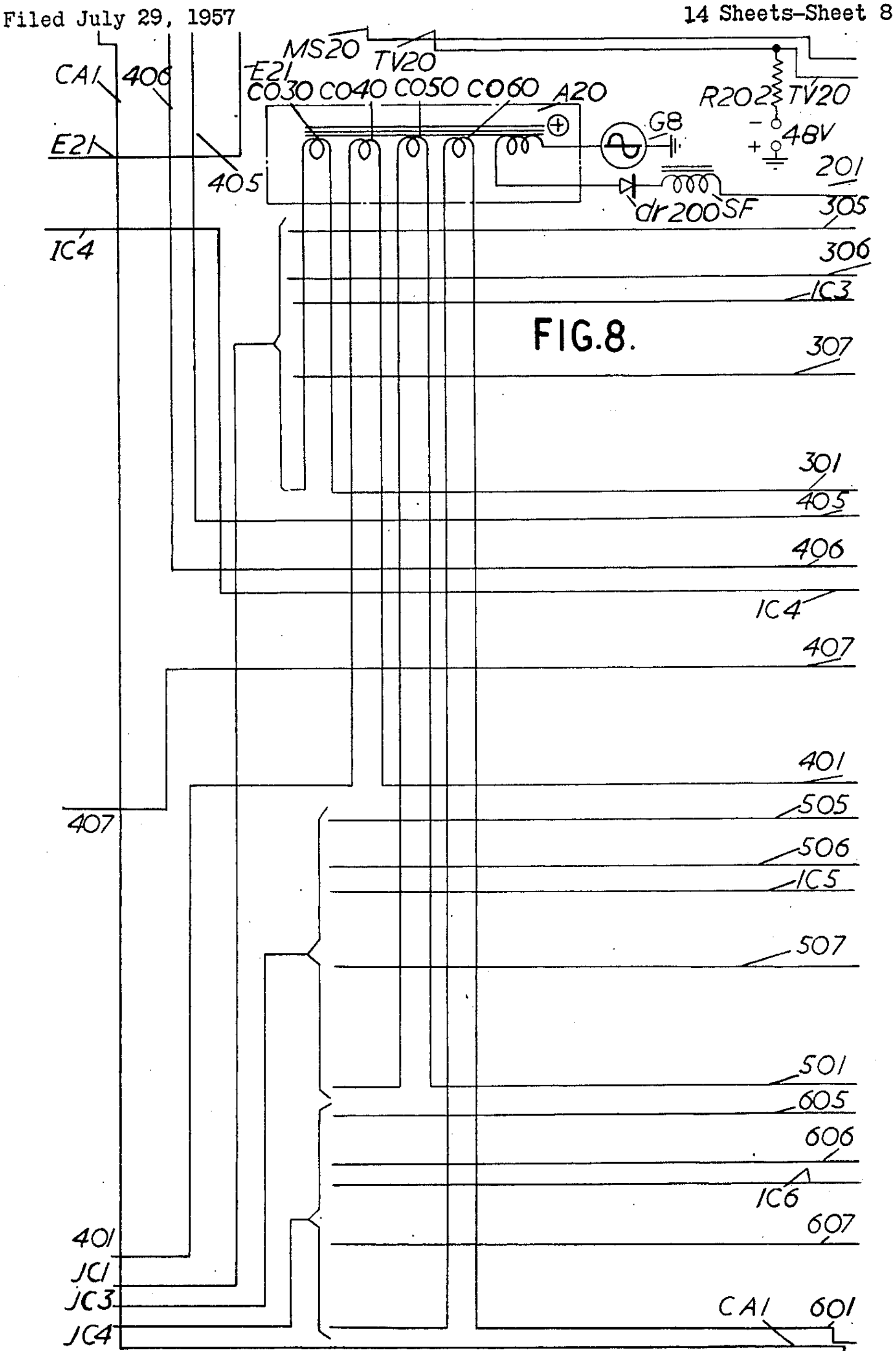
FIGS. 8 and 9 show a register connector circuit that is associated with the register shown in FIGS. 10 and 11.
Figure 9:
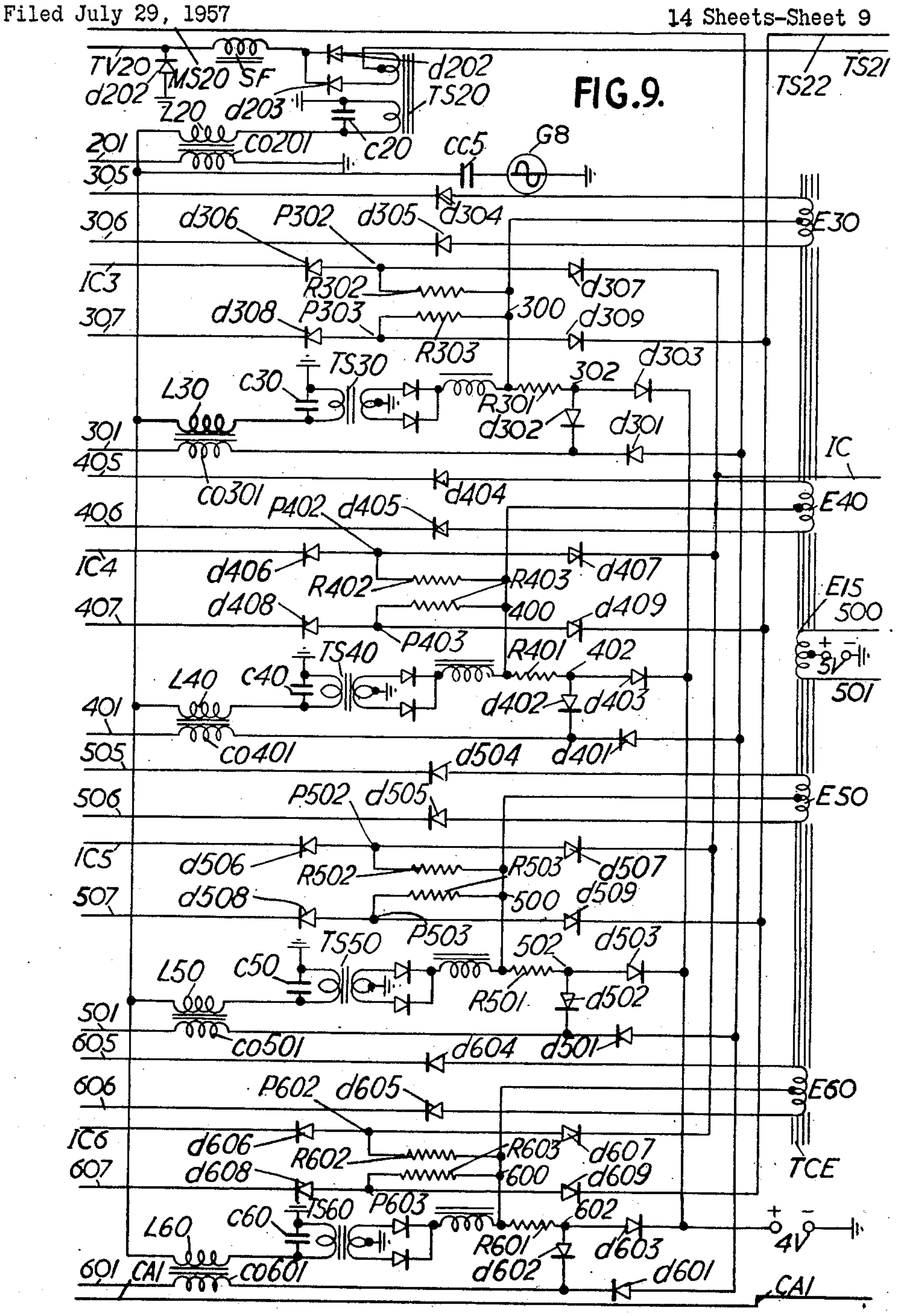
Figure 10:
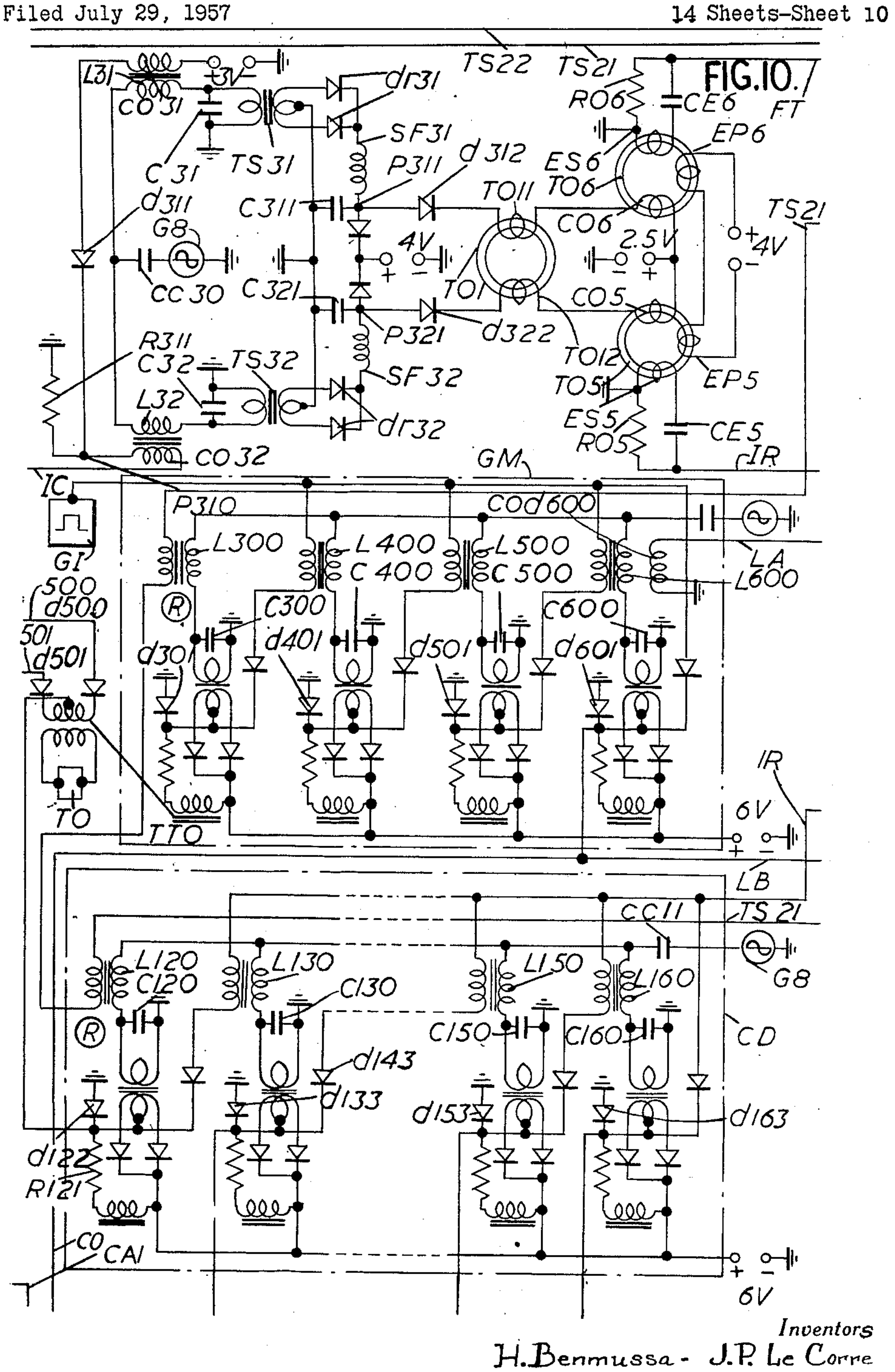
Figure 11:
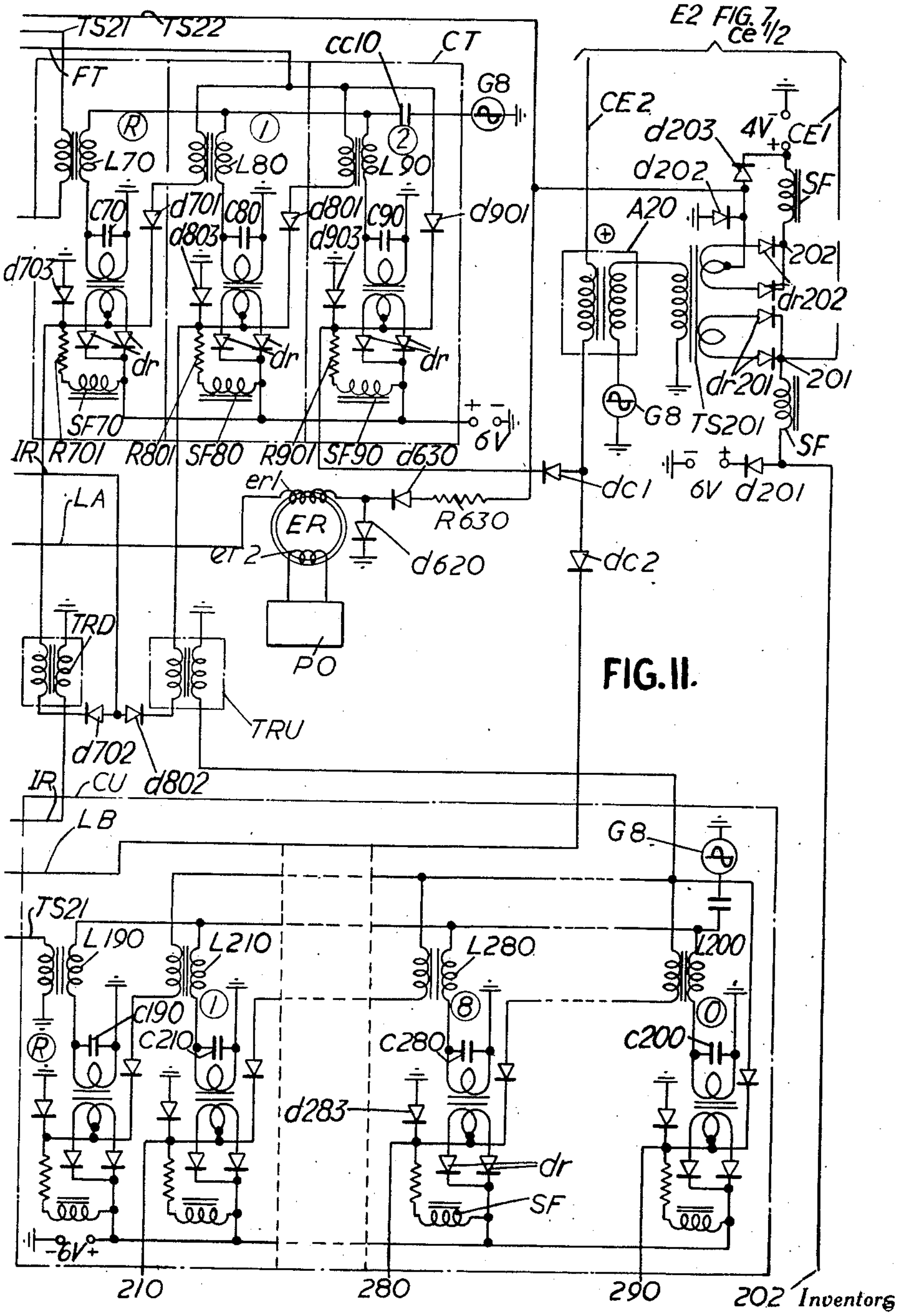
Figure 12:
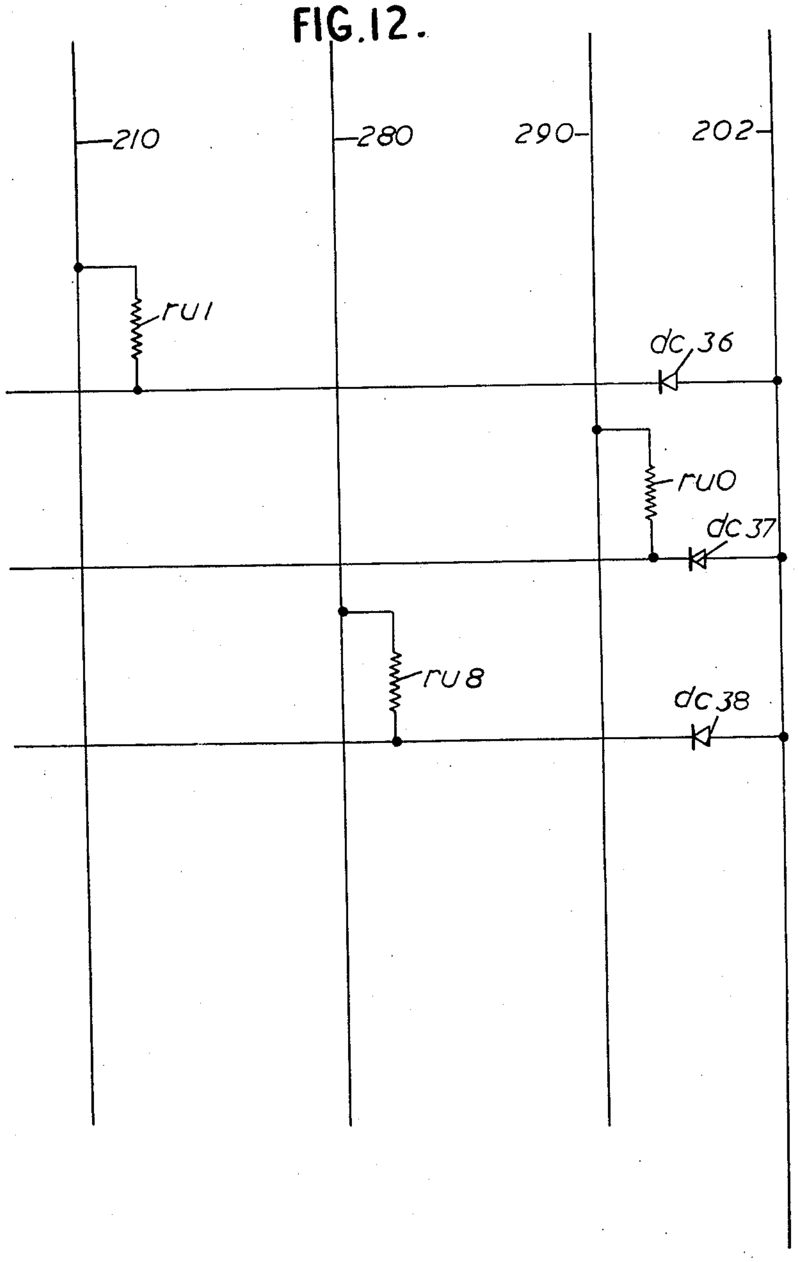
FIGS. 12 and 13 show a decoding circuit associated with the register shown in FIGS. 10 and 11.
Figure 13:
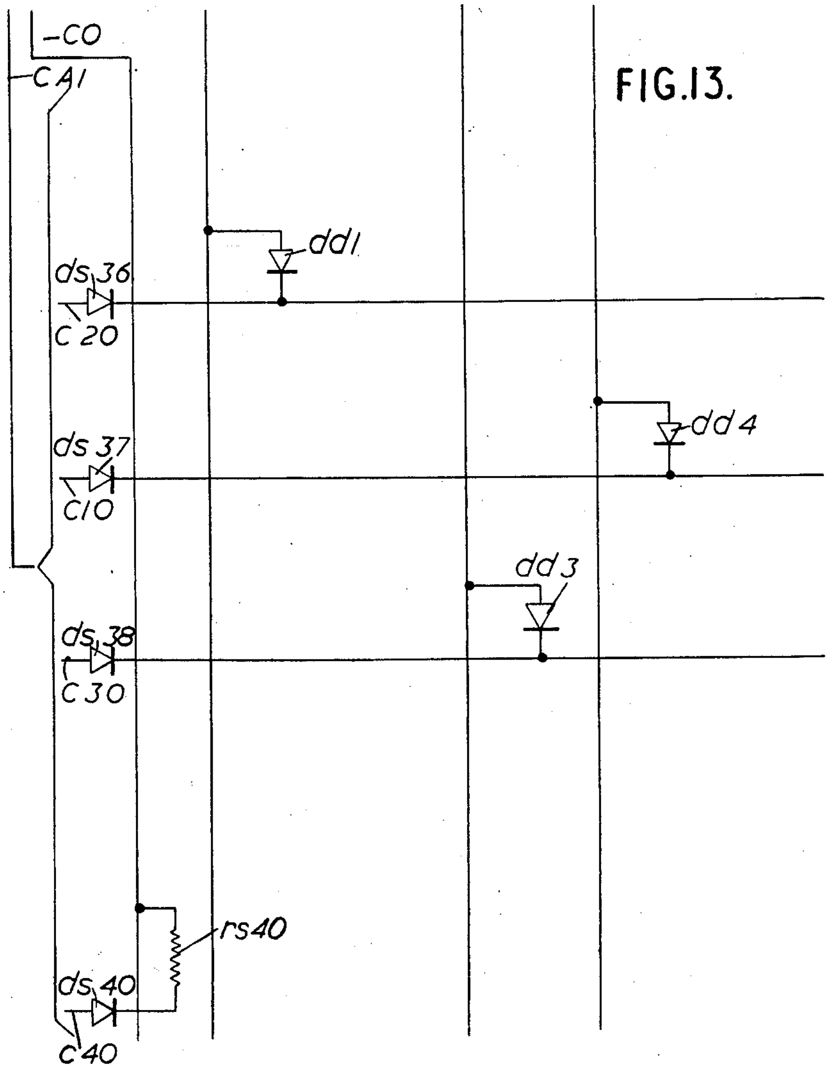

It will now be assumed that the register shown in FIGS. 8 to 11 is free, the register connector (FIGS. 8 and 9) being then in "normal" position, and that the register allotter (FIG. 7) has chosen that register to handle the next call, that is to say, that flip-flop circuit L15—C15 (FIG. 7) is in "operating" position. A +3-volt potential is then applied to conductor MS20 (FIGS. 7, 8 and 9) from the register allotter circuit (FIG. 7). This potential is applied through control windings *co*301, *co*401, *co*501 and *co*601 (FIG. 9) in parallel to each of connectors J1 to J4, the connection in parallel being made respectively through decoupling rectifiers *d*301, *d*401, *d*501 and *d*601. Each of these four circuits going to the four connectors comprises, in series, a control winding of magnetic amplifier A20 (FIG. 8) of the register connector. The circuit from the register allotter (FIG. 6) to connector J2, shown in detail in FIGS. 4 and 5, is as follows: conductor MS20 (FIGS. 7, 8 and 9) brought to +3 volts as previously explained, diode *d*401, control winding *co*401 of flip-flop circuit L40—C40, conductor 401 (FIGS. 9 and 8), control winding *co*40 of magnetic amplifier A20, conductor 401 FIGS. 8 and 5), resistance R451, conductor TV2. As explained above, when connector J2 (FIGS. 4 and 5) has left the "normal" position, conductor TV2 has been brought to a negative potential close to ground potential (—.5 volt for example) owing to the return of flip-flop circuit L13—C13 to "normal" position. Under these conditions, current flows in the circuit just described. The flowing of this current through control winding *co*40 blocks magnetic amplifier A20 (FIG. 8), the effect of this being to suppress the blocking current in winding *co*20 of flip-flop circuit L20—C20 (FIG. 9). Further, the flowing of the same current through control winding *co*401 of flip-flop circuit L40—C40 (FIG. 9) causes this flip-flop circuit to shift into "operating" position, which through the common condenser CC5 in the 8-kc. A.C. supply circuit causes flip-flop circuit L20—C20 to return to normal. The return to normal of circuit L20—C20 causes the removal from conductor TV20 (FIGS. 7, 8 and 9) of the 5-volt potential that characterized the availability of the register. Conductor TV20 is then brought to a very slightly negative potential with respect to ground owing to the fact that current flows from the negative terminal of the 48-volt battery to ground across resistance R202 (FIG. 8) and diode *d*202 (FIG. 9), which under these conditions shows a low impedance. Conductor TV20 being no longer at +5 volts, circuit L25—C25 of the register allotter (FIG. 7) can shift into "operating" position so that the scanning of the registers will recommence, the allotter shifting to its second stable condition, which it keeps if the second register is free. When the flip-flop circuit L40—C40 (FIG. 9) associated with connector J2 (FIGS. 4 and 5) shifts into "operating" position, an alternating voltage appears at the terminals of the secondary winding of transformer TS40. This voltage is rectified and filtered as has already been explained and a direct voltage of the order of +6 volts appears at common point 402 of resistance R401 and diodes *d*402 and *d*403. The +6-volt potential applied to the midpoint of winding E40 of transformer TC (FIG. 9) causes the unblocking of diodes *d*404 and *d*405, which constitute an electronic gate similar to the one used in the connector (FIG. 4). Output winding E5 of transformer TC (FIG. 4), whose midpoint is brought to +5 volts, is connected by conductors 405 and 406 (FIGS. 7, 8 and 9) and by diodes *d*404 and *d*405 to winding E40, whose midpoint is connected to point 400 (FIG. 9). So long as circuit L40—C40 is in "normal" position, the mid-point of winding E40 is brought to ground potential, so that diodes *d*404 and *d*405 are blocked. When circuit L40—C40 shifts into "operating" position, point 400 is brought to a 6-volt potential, which unblocks diodes *d*404 and *d*405, which then show a low impedance.

As already explained, as soon as flip-flop circuit L20—C20 (FIG. 9) has left the "normal" position, it causes the removal of the 5-volt availability potential from conductor TV20, which is then brought to a negative potential close to the ground potential (−.5 volt for example), and the register allotter (FIG. 7) causes conductor MS20 to return to the ground potential. The current flowing in control winding *co*401 of flip-flop circuit L40—C40 from the register allotter ceases then but is replaced with a guard current flowing in the following circuit: point 400 of circuit L40—C40 (FIG. 9), brought to +6 volts, resistance R401, diode *d*402, control winding *co*401 of circuit L40—C40, conductor 401 (FIGS. 9 and 8), control winding *co*40 of magnetic amplifier A20, conductor 401 (FIGS. 8 and 5), resistance R451, conductor TV3 brought to a potential slightly negative with respect to ground. As already explained, the potential of conductor TV2 is under the subscriber's control, that is to say, this conductor is at a potential slightly negative with respect to ground while the subscriber keeps his handset off the hook and returns to a potential of the order of +5 volts when the subscriber replaces his handset. It will be understood that, under these conditions, the register is under the subscriber's control and that if the subscriber hangs up he will release the connector (FIGS. 4 and 5) and the register (FIGS. 8 to 13) in succession. Further, the +5-volt potential applied to conductor 401 prevents the seizure of the connector by the other register and consequently busies the connector.

The register properly so called shown in FIGS. 10 to 13 will now be described. The top portion of FIG. 10 shows a pulse-modifying and end-of-pulse-train-detecting circuit the operation of which will be described later on and which supplies to conductor IR a positive pulse for each pulse applied to the input and to conductor FT a positive pulse at the end of each train of dial pulses. The left-hand top portion of FIG. 11 shows a pulse-train metering circuit shown enclosed in a dot-dash box CT and comprising three positions, namely: the "normal" position, indicated by the letter R inside a circle, a position 1 and a position 2. This meter is made up of three flip-flop circuits L70—C70, L80—C80 and L90—C90. These flip-flop circuits are similar to those used in the other figures, so that only their components and their operation will be described in detail. The set of three flip-flop circuits making up meter CT has three stable conditions, only one of these flip-flop circuits being able to remain in "operating" position owing to the presence of common condenser CC10 in the 8-kc. A.C. supply circuit. The control pulses characterizing the end of a pulse train are applied by conductor FT in parallel to the control windings of flip-flop circuits L80—C80 and L90—C90. The midpoint of the secondary winding of the output transformer of each flip-flop circuit is connected to the control winding of the next flip-flop circuit by a diode, *d*701 and *d*801 respectively. If flip-flop circuit R of meter CT is in "normal," the cathode of diode *d*701 is brought to a potential of +6 volts by means of the following circuit: positive terminal of the 6-volt battery, whose negative terminal is grounded, filtering self-inductance SF70, resistance R701, cathode of diode *d*701. Diode *d*703, whose cathode is brought to a positive potential, is blocked. Consequently, the positive pulses applied by conductor FT cannot act upon the control winding associated with the coil L80 of the next flip-flop circuit. When flip-flop circuit R is in "operating" position, a potential slightly higher than 6 volts appears at the terminals of resistance R701 with such a polarity that it cancels the 6-volt biasing potential. Diode *d*703, whose cathode is brought to a negative potential (of the order of −.5 volt), then shows a low impedance and applies ground potential to the cathode of diode *d*701, so that diode *d*701 is unblocked for the positive pulses applied from conductor FT, which can then act upon the control winding associated with coil L80. It will be understood that the control current flowing through diode *d*701 is of opposite direction to the biasing current of diode *d*703, but the biasing current is substantially greater than the sum of the control current and of the other currents of the same direction that can be superimposed, as will appear later on, so that the potential of the cathode of diode *d*703 is not modified substantially. It is easy to understand that the first pulse causes flip-flop circuit L80—C80 of meter CT to shift into "operating" position, thus causing the return to normal of circuit L70—C70 and the unblocking of diode *d*801, which will allow the next pulse to act upon the control winding associated with coil L90 of flip-flop circuit L90—C90 of meter CT.

The output voltages of ferroresonant flip-flop circuits L70—C70, L80—C80 and L90—C90 appear respectively at the cathodes of diodes *d*703, *d*803 and *d*903, which are brought to a potential of +6 volts when the associated flip-flop circuit is in "normal" and to ground potential when the associated flip-flop circuit is in "operating" position. For the first two flip-flop circuits this voltage is used to control the electronic gate inserted in the circuit applying the control pulses to the next flip-flop circuit, as has just been explained. The output voltage of the third flip-flop circuit, L90—C90, is also applied, through diode *d*901, to conductor FT, this diode constituting a low-impedance load connected to conductor FT when circuit L90—C90 is in "operating" position. The output voltages of flip-flop circuits L70—C70 and L80—C80 are also used to control electronic gates directing the dial pulses appearing on conductor IR either to the tens meter CD (FIG. 10) or to the units meter CU (FIG. 11). The dial pulses appear on conductor IR as positive pulses.

When flip-flop circuits L20—C20 (FIG. 9) of the register connector (FIGS. 8 and 9) is in "normal," which characterizes the availablility of the associated register, the output current of transformer TS20 is also used to block all the meters of the register circuit in "normal" position, over the following circuit: midpoint of the output winding of transformer TS20 (FIG. 9), conductor TS21 (FIGS. 9, 10 and 11), control winding of stage R of meter CT, conductor TS21 (FIGS. 11 and 12), windings connected in series of stages R of meters CM and CD, conductor TS21 (FIGS. 10 and 11), control winding of stage R of meter CU, ground (FIG. 11), grounded positive terminal (FIG. 8) of the 48-volt battery (FIG. 8), 48-volt battery, resistance R202, filtering coil SF and cathodes of rectifiers *d*202 and *d*203 connected to the ends of the secondary winding of transformer TS20. At this stage of operation, calling connector J2, to which is connected calling line circuit CL2, is connected to a register, which then sends the line circuit the dialing tone. The dialing-tone generator is shown at TO (FIG. 10) and is connected to the ends of the primary winding of transformer TTO, the two ends of which are connected by conductors 500 and 501 comprising diodes *d*500 and *d*501 respectively in series to the ends of output winding E15 of transformer TCE of the register connector (FIGS. 8 and 9). The midpoint of winding E15 of transformer TCE (FIG. 9) is brought to a potential of +5 volts and the midpoint of the secondary winding of transformer TTO (FIG. 10) is connected to the common point of resistance R121 and of diode *d*122 of stage R of meter CD. Ground potential is applied to this point owing to the fact that meter CD, as well as all the other meters of the register circuit, are in "normal" position. The midpoint of transformer TTO being at ground potential, diodes *d*500 and *d*501 show a low impedance, so that the dialing tone is sent to winding E15 of transformer TC (FIG. 9). As explained in connection with the operation of the connector circuit (FIGS. 8 and 9), flip-flop circuit L40—C40, belonging to connector J2, is shifted into "operating" position, causing the unblocking of the electronic gate made up of winding E40 of transformer TCE (FIG. 9), winding E5 of transformer TC (FIG. 4) and diodes *d*404 and *d*405. This tone is sent to the subscriber line circuit through the electronic gate made up of winding E2 of transformer TC (FIG. 4), the secondary winding of transformer T12 (FIG. 3) and diodes *d*21 and *d*22 and which is unblocked when connector F2 takes over the call. In answer to the sending of this tone the calling subscriber dials the called subscriber's number. In the case involved, of a 20-line automatic switchboard, the calling subscriber dials only two digits: the tens and units digits in succession.

It is assumed that the subscriber has a classical telephone station in which the pulses are sent through the opening of the line. At each opening of the line by the dial switch, diode *da*22 (FIG. 3), which was biased by the transmitter current, is blocked and this practically suppresses the current in the guard circuit comprising in series the right-hand control winding of amplifier A12 (FIG. 5). At each opening of the line this amplifier is blocked and diode *d*135 shows a high impedance because of the positive 4-volt biasing applied to its cathode through resistance R41. When the subscriber line is looped by the closing of the dial switch, amplifier A12 (FIG. 5) is again unblocked and its output potential is in opposition to the 4-volt biasing potential, thus bringing the cathode of diode *d*135 to a negative potential, so that it shows a low impedance.

The pulse-receiving circuit, which also has the function of restoring the dial pulses and of suppressing interference pulses resulting from the bouncing of the dial contacts, is shown in the top portion of FIG. 10. It comprises two flip-flop circuits, L31—C31 and L32—C32, supplied 8-kc. alternating current through a common condenser CC30 so designed that only one of these two flip-flop circuits can remain in "operating" position. When the circuit is in normal, flip-flop circuit L31—C31 is in "operating" position owing to the flowing of current in the following circuit: positive terminal of a +3-volt biasing source whose negative terminal is grounded, control winding *co*31 of flip-flop circuit L31—C31, diode *d*311, resistance R311, ground. The control winding of flip-flop circuit L32—C32 is connected between conductor IC (FIGS. 9 and 10) and point 310 common to diode *d*311 and to resistance R311. The circuit being in normal, point P310 common to diode *d*311 and to resistance R311 is at a potential very close to +3 volts, the resistance of winding *co*31 being negligible.

Diode *d*135 (FIG. 5) shows a low impedance before the subscriber dials. Current then flows in the following circuit: point 400 of flip-flop circuit L40—C40 (FIG. 9) brought to a potential of the order of +6 volts obtained by rectification of the output voltage of the secondary winding of transformer TS40, resistance R402, diode *d*406, conductor IC4 (FIGS. 9, 8 and 5), diode *d*135, which shows a low impedance, ground. The biasing current of diode *d*135 and the current flowing over conductor IC4 are of opposite direction but it will be understood that resistance R402 (FIG. 9) is designed so that the current flowing over conductor IC4 will be substantially less than the biasing current of diode *d*135 (FIG. 5), so that the potential of the cathode of this diode is not modified substantially. Under these conditions, the potential of point P402 common to both diodes *d*406 and *d*407 is very close to the ground potential. Diode *d*407 (FIG. 9) is then blocked, point P310 (FIG. 10) being at a potential of the order of +3 volts. The current flowing in winding *co*31 therefore keeps flip-flop circuit L31—C31 in "operating" position. When the dial switch opens the line it causes, as has already been explained, the blocking of diode *d*135 (FIG. 5), which shows a high impedance owing to its cathode being brought to +4 volts. Current can then flow in the following circuit: point 400 brought to +6 volts, resistance R402, diode *d*406, conductor IC4 (FIGS. 9, 8 and 5), resistance R41, +4-volt biasing source, ground. Because of the direction of connection of the 4-volt biasing battery and the voltage drop in resistance R41 (FIG. 5), the potential of point P402 is brought to a value of +4 volts with respect to ground. Current then flows in the following circuit: point 402 (FIG. 9) brought to a value above +4 volts, diode *d*407, conductor IC (FIGS. 9 and 10), control winding *co*32 of flip-flop circuit L32—C32, point 310, resistance R311, ground. Resistances R401 (FIG. 9) and R311 (FIG. 10) as well as the other components of the circuit are designed so that point P310 will take a potential greater than +3 volts, thus blocking diode *d*311 and suppressing the current in winding *co*31 of flip-flop circuit L31—C31. Circuit L32—C32 shifts into "operating" position and causes circuit L31—C31 to return to "normal" position. This condition lasts throughout the opening of the line. When the dial switch again closes the line, amplifier A12 (FIG. 5) is unblocked, causing the biasing of diode *d*135 (FIG. 5) and the return to the initial condition of flip-flop circuits L31—C31 and L32—C32.

Amplifier A12 (FIG. 5) is blocked at each opening of the line so that current can flow in control winding *co*131 of flip-flop circuit L13—C13 (FIG. 5) and thus cause its return to "operating" position. To prevent any disturbances this might lead to in the operation of the connector, delay circuit RE (FIG. 5) is introduced in series with the control winding. This circuit delays the building up of the current in the circuit of control winding *co*131 by a time interval exceeding the opening of the line by the dial switch, or 60 milliseconds, so that flip-flop circuit L13—C13 remains in "normal" position during the reception of the dial pulses.

The four metering circuits of the register (FIGS. 10 and 11) are normally blocked in "normal" position while the register is available, the blocking circuit being used, as will later be explained, to return this meter to normal when the register has completed its work and is again available. The blocking current flowing in series in the control windings of the flip-flop circuits from the "normal" position of each of the meters is, as explained above, the output current of flip-flop circuit L20—C20 (FIG. 9), whose being in "operating" position characterizes the availability of the register. As soon as the register has been chosen to handle a call, circuit L20—C20 (FIG. 9) returns to "normal" position, so the blocking current is suppressed. The register's meters can then leave their "normal" position in answer to the pulses sent by the calling subscriber or, in the case of meter CM (FIG. 10), in answer to metering pulses the purpose of which will be explained later. As has been explained above, the dial pulses appear on conductor IR (FIGS. 10 and 11) as positive pulses. Upon the reception of the first pulse train, pulse-train meter CT (FIG. 10) is in "normal" position and diode *d*703 shows a low impedance; consequently, the pulses can follow the following circuit: conductor IR (FIGS. 10 and 11), diode *d*702, primary winding of transformer TRD, diode *d*703, which shows a low impedance, ground. Positive pulses appear at the terminals of the secondary winding of transformer TRD and they are applied in common to all the control windings of the flip-flop circuits of tens meter CD (FIG. 9) by means of conductor IR (FIGS. 10 and 11), except, however, flip-flop circuit R (L120—C120), which characterizes the "normal" position. Upon the reception of the first pulse, meter CD shifts to position 1, in which flip-flop circuit L130—C130 is in "operating" position, causing the return to "normal" of flip-flop circuit L120—C120.

Meters CM and CD (FIG. 10) and CU (FIG. 11) are wholly identical with meter CT (FIG. 11) and, since their operation is also identical it will not be described. Further, to simplify the drawing, only such components of meters CM, CD and CU are referenced as are necessary for a description of the operation of the circuit.

As soon as flip-flop circuit L120—C120 of meter CD (FIG. 10) leaves the "normal" position, diode *d*122 is again biased from the positive terminal of the +6-volt battery, so that it shows a high impedance, causing the blocking of diodes *d*500 and *d*501 and, consequently, the suppression of the sending of the dialing tone to the calling subscriber. Tens meter CD shifts to the position corresponding to the number of pulses sent by the calling subscriber in the course of the first pulse train. In the case under consideration it is assumed that the pulses sent for the first train are at most four in number, but it should be understood that, in the case of an automatic switchboard comprising a larger number of lines, tens meter CD (FIG. 10) could comprise a larger number of stages. At the end of the first pulse-train sent by the calling subscriber a positive pulse appears over conductor FT (FIGS. 10 and 11) and is applied to the control windings of the last two stages of meter CT (FIG. 11), causing this meter to shift to position 1, in which flip-flop circuit L80—C80 is in "operating" position, flip-flop circuit L70—C70 returning to "normal" position. Under these conditions, the diode *d*703 associated with flip-flop circuit L70—C70 of meter CT (FIG. 11) shows a high impedance, blocking diode *d*702, while diode *d*803, associated with flip-flop circuit L80—C80, shows a low impedance and consequently unblocks diode *d*802, so that the positive pulses appearing over conductor IR (FIGS. 10 and 11) and belonging to the second pulse-train pass through diode *d*803, grounded, which shows a low impedance. The positive pulses appearing in the secondary winding of transformer TRU are applied in parallel to all the control windings of the flip-flop circuits making up units meter CU, except, however, for flip-flop circuit L190—C190, which characterizes the "normal" position. This meter is identical with meters CT (FIG. 11) and CD (FIG. 10) and operates exactly the same way. In the example under consideration it comprises ten stages, plus the one characterizing the "normal" position, and in answer to the control pulses it shifts to the position corresponding to the number of pulses sent by the calling subscriber. At the end of the second pulse-train sent by the calling subscriber a positive pulse appears over conductor FT (FIGS. 10 and 11) and it causes meter CT to shift to position 2, which indicates that the second pulse-train has been received. The register then has all the information needed to establish the connection.

All of the circuit engaged in this stage of operation are under the calling subscriber's control. In fact, if the calling subscriber hangs up, he causes, as has already been explained, the return of connector J2 (FIGS. 4 and 5) to normal owing to the fact that diode *da*22 (FIG. 3) shows a high impedance upon the suppression of the transmitter's supply current. As soon as flip-flop circuit L13—C13 (FIG. 5) returns to "normal," characterizing the availability of connector J2, the output current of L13—C13 blocks diode *d*133 (FIG. 5), which then shows a high impedance to the guard current of the register connector (FIGS. 8 and 9), which, through conductor 401 (FIGS. 5, 8 and 9), flows through winding *co*40 of magnetic amplifier A20 (FIG.8) and the control winding of flip-flop circuit L40—C40 (FIG. 9). As soon as this guard current ceases, amplifier A20 is unblocked and its output current is used to cause flip-flop circuit L20—C20 (FIG. 9) to shift to "operating" position. The output current of flip-flop circuit L20—C20 is used to bring conductor TV20 to a potential of +5 volts, which characterizes the availability of the register to the register connector (FIG. 7), and to restore all the registers (FIG. 10 and 11) to the "normal" condition.

*Operation of the Register Circuit*

Figure 14:
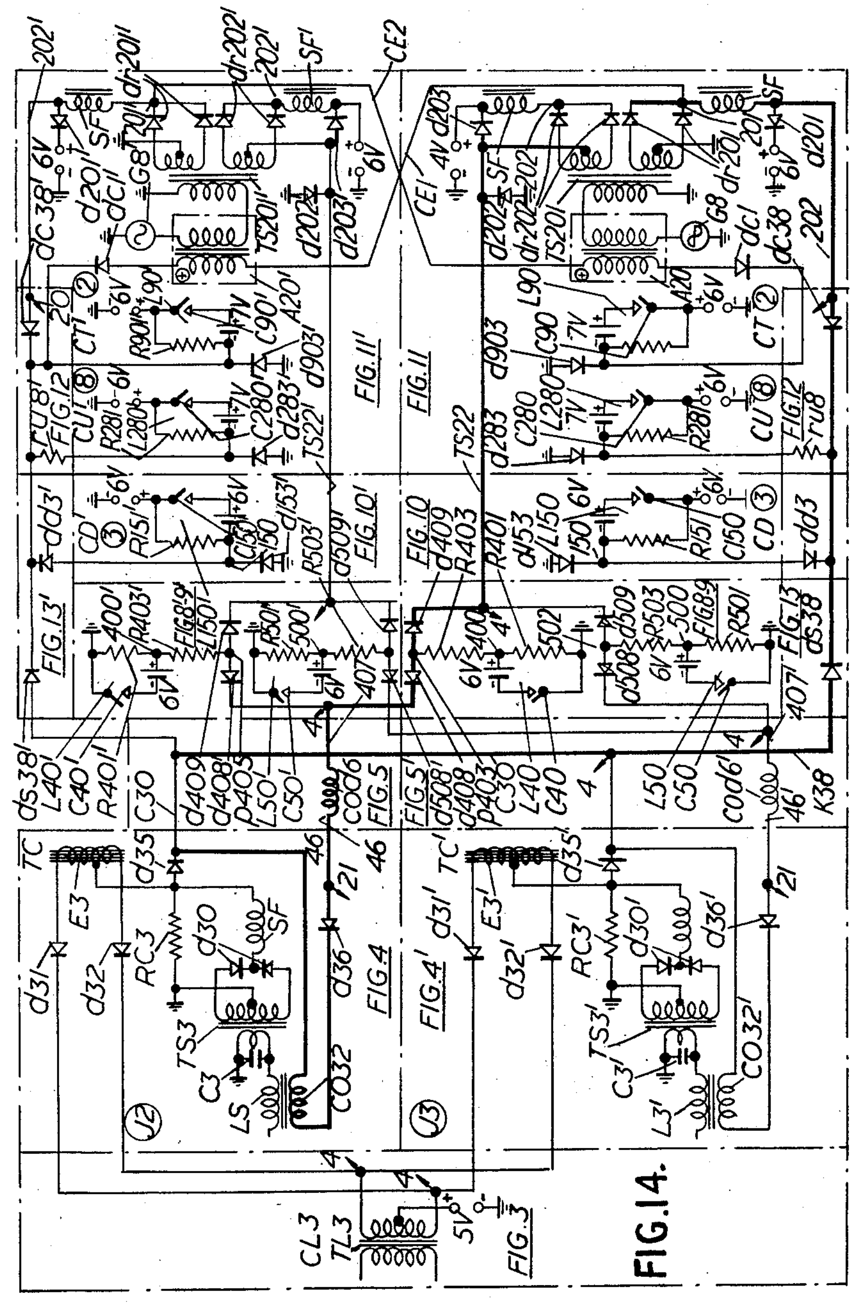
FIG. 14 shows schematically the circuits used for the testing and for the establishment by the register of a connection to a called subscriber.

The operation of the circuit used for testing and for connecting the called subscriber (FIG. 3) to the connector circuit (FIGS. 4 and 5) will now be described with reference to FIG. 14, which shows, in simplified form, all the circuits that are brought into play for this phase of operation of the automatic switchboard. FIG. 14 also shows the second register (E2) and the associated register connector, so as more clearly to show how these circuits react upon one another in the course of operation. In general, the components shown in FIG. 14 have been given the same references as the corresponding components in FIGS. 11 to 13. The components of the second connector (J3) and of the second register (E2) bear the same references, but primed, as the corresponding components of connector J2 and register E1, respectively, shown in detail in FIGS. 4, 5, 8, 9, 10, 11, 12 and 13. To simplify the drawing, a ferro-resonant flip-flop circuit is shown as a current source in series with a resistance and a contact is shown the same way as an electromechanical-relay contact. It will be understood that when the corresponding flip-flop circuit is in "normal" position the contact is open and no potential appears at the terminals of the resistance, while when the flip-flop circuit is in "operating" position the contact is closed and the battery potential does appear at the terminals of the resistance.

When the circuit is in normal, the two registers being in normal, amplifiers A20 and A20', respectively comprised in registers E1 and E2 (FIGS. 11 and 11'), are unblocked, so that an alternating potential is applied to the primary winding of the associated transformer, respectively TS201 and TS201'. The function of transformer TS201 will be described more particularly, it being understood that transformer TS201' operates the same way. The lower secondary winding of transformer TS201 supplies, after rectification by diodes *dr*201, a potential of the order of +6 volts, which appears at point 201, this potential being held at 6 volts by means of clipping diode *d*201, whose cathode is brought to +6 volts with respect to ground. This potential is applied by conductor 202 (FIGS. 11 and 12) and decoupling diodes such as *dc*38 (FIG. 12) to each of the horizontal conductors of the decoding matrix, each corresponding to a subscriber, the decoding matrix being shown more fully in FIGS. 12 and 13. It follows that the horizontal conductors of the decoding matrix are kept at a potential at least equal to +6 volts regardless of the output potentials of the tens and units meters. Diodes such as *ds*38 (in series with each horizontal conductor) at the output of the decoding matrix are then blocked. The +6-volt potential appearing at point 201 (FIG. 11) is also applied by conductor CE1 to one of the ends of the control winding of amplifier A20' (FIG. 11'), the other end of which is connected to the output of stage 2 of pulse-train meter CT', that is to say, to the cathode of diode *d*903'. So long as register E'2 (FIGS. 8', 9', 10' and 11') is in normal or, if it is busy, so long as the sending of the number of the subscriber called by the calling subscriber is not completed, meter CT' (FIG. 11') is not in position 2 and the cathode of diode *d*903' is brought to a potential of +6 volts from the biasing battery. It follows that no current flows through the control winding of amplifier A20'. It is easy to see that the +6-volt potential appearing at point 201' of amplifier A20' (FIG. 11') is applied by conductor CE2 to one of the ends of the control winding of amplifier A20 of register E1, the other end of which is connected to the output of stage 2 (cathode of diode *d*903) of pulse-train meter CT (FIG. 11) by decoupling diode *dc*1. Further, the output current of the upper winding of transformer TS201 brings point 202 to a potential of the order of +5 volts, it then being possible for current to build up in the following circuit: ground, +4-volt biasing battery, filtering self-inductance, point 202 brought to a potential of +5 volts with respect to the midpoint of the upper output winding of transformer TS201, cathode of diode *d*202, ground. This diode then shows a low impedance and its cathode is brought to a negative potential very close to ground potential (−.5 volt for example). It has been assumed at the beginning of the description that register E1 (FIGS. 8 to 11) was connected through the register connector (FIGS. 8 and 9) to connector J2, to which the calling subscriber is connected. This connection is obtained by means of electronic gates, and particularly the register connector's electronic gate is opened following the shifting to "operating" position of flip-flop circuit L40—C40, which brings point 400 to a potential of the order of +6 volts. Current can then build up in the following circuit: point 400 brought to +6 volts, resistance R403, diode *d*409, conductor TS22 (FIGS. 9, 10 and 11), diode *d*202, ground. This current is in opposition to the biasing current of diode *d*202 (FIG. 11), but the value of resistance R403 is chosen so that it will be substantially less than the biasing current and consequently the potential on the cathode of diode *d*202 will not be modified substantially. Point P403 is therefore brought practically to ground potential. The control circuit, in the case of a called subscriber having for example the number 38 and with whom is associated flip-flop circuit L3—C3 in connector J2 (FIGS. 4 and 5), is shown in heavy lines and is similar to the control circuit going to the other subscribers. When the register is in "normal" or when dialing has not been completed and pulse-train meter CT (FIG. 11) has not reached position 2, the cathode of diode *ds*38 (FIG. 13) is brought to +6 volts and point P403 (FIG. 9) is brought to ground potential, so that no current can flow through winding *co*32 of flip-flop circuit L3—C3 (FIG. 4) in series in the control circuit shown in heavy lines (FIG. 14). Upon the end of the reception of the second pulse-train sent by the calling subscriber, meter CT shifts to position 2 and current flows through diode *d*903 (FIG. 11) owing to the fact that, after rectification, the output current of flip-flop circuit L90—C90 (FIG. 11) is in opposition to and slightly higher than the biasing voltage. Current can then flow in the following circuit: point 201′ of register E2 (FIG. 11′) brought to +6 volts, conductor CE2, control winding of amplifier A20, diode *d*903, ground. The current flowing is in opposition to the biasing current of diode *d*903, but it is assumed that amplifier A20 or a suitable additional resistance are designed so as to limit this current to a value substantially below the value of the biasing current of diode *d*903, whose cathode potential is not modified substantially. The flowing of this current in the control winding of amplifier A20 blocks this amplifier, so that no output voltage appears at the terminals of the secondary windings of transformer TS201. It is because of the blocking of amplifier A20 that suitable voltages will appear to cause the flowing of current in the second control winding of flip-flop circuit L3—C3 (FIG. 4), controlling the electronic gate associated with the called subscriber in connector J2, which is already connected to the calling subscriber. The suppression of the output potential of transformer TS201 has the effect of bringing point 201 to ground potential, so that no current can flow in the control winding of amplifier A20′ (FIG. 11′) even if the pulse-train meter of register E2 reaches position 2. The interconnection of the registers is therefore designed so that only one register at a time can bring about the opening of the electronic gate associated in the connector with the corresponding calling subscriber. It will be understood that, as soon as register E1 has completed the switching operations leading to the connection of the called and calling subscribers or to the sending of the busy tone, it will be released, thus causing the unblocking of amplifier A20 and the appearance of a +6-volt potential at point 201, which will then allow the other register to effect in turn the testing and the connection of a called subscriber. The biasing current of diode *d*202 is suppressed upon the blocking of amplifier A20; this diode then shows a high impedance, so that point P403 (FIG. 9) takes a potential of +4 volts. The potential of point P403 (FIG. 9) is limited to +4 volts by clipping diode *d*203 (FIG. 11). Further, point 201 (FIG. 11) is at ground potential, which is applied to all the anodes of diodes such as *dc*37, *dc*38, *dc*39, connected in series on each of the horizontal conductors of the decoding matrix.

The various cases likely to arise for determining the potential of the horizontal conductor of the decoding matrix corresponding to each subscriber will be examined in succession.

If the tens and units digits dialed by the calling subscriber are not the tens and units digits of the number of the subscriber associated with the proper horizontal conductor of the decoding matrix, this conductor is brought to +6 volts owing to the fact that the corresponding flip-flop circuits in the tens and units meters are in "normal" position, the cathodes of diodes such as *d*153 (FIG. 10) and *d*283 (FIG. 11) being at a potential of +6 volts. Diode *dc*38 is then blocked because its anode is brought to ground potential and because its cathode is brought to +6 volts and diode *ds*38 (FIG. 13) is also blocked, its anode being brought, by means of the circuit shown in heavy lines, to a potential of +4 volts, which is the potential of point P403 (FIG. 9), and its cathode being brought to +6 volts. No current will thus flow in this case in control winding *co*32 (FIG. 4), corresponding to the subscriber associated with that horizontal conductor of the decoding matrix.

If the tens digit dialed by the calling subscriber actually is the tens digit of the subscriber associated with the horizontal line involved of the decoding matrix but the units digit dialed is different from that of the subscriber associated with said horizontal line of the decoding matrix, the flip-flop circuit associated with tens meter CD (FIG. 10) is in "operating" position and the flip-flop circuit associated with units meter CU is in "normal." In the example shown in FIG. 14, diode *d*153 of flip-flop circuit L150—C150 of meter CD shows a low impedance and point 150 is practically at ground potential, while flip-flop circuit L280—C280 of meter CU (FIG. 11) is in "normal" and brings the cathode of diode *d*283 to +6 volts. The horizontal conductor involved is then brought to +6 volts and things are back to the preceding case.

When only the units digit dialed by the calling subscriber actually is the units digit of the subscriber associated with that horizontal line of the decoding matrix, this conductor is also brought to +6 volts because of the current flowing in the following circuit: point 150 brought to +6 volts, diode *dd*3 (FIG. 13), resistance *ru*8, diode *d*283, which shows a low impedance because flip-flop circuit L280—C280 is in "operating" position. The +6-volt potential then appears at the terminals of resistance *ru*8 and the horizontal conductor involved of the decoding matrix is brought to +6 volts.

When the two digits dialed by the calling subscriber actually are the digits of the number of the subscriber associated with the horizontal conductor involved of the decoding matrix, 3 and 8 for example, this conductor is brought to ground potential because the two diodes *d*283 of stage 8 of units meter CU and *d*153 of stage 3 of tens meters CD (FIG. 10) are both biased so as to show a low impedance. Current can then flow between point P403 of flip-flop circuit L40—C40 (FIG. 9) brought to +4 volts and the horizontal conductor of the decoding matrix brought to ground potential, this current following the circuit shown in heavy lines in FIG. 14 and passing through winding *co*32 of flip-flop circuit L3—C3 (FIG. 4) as also through right-hand control winding *cod*6 of flip-flop circuit L6—C6 (FIG. 5). As has already been explained with reference to the connection of the called subscriber to the connector, flip-flop circuit L3—C3, when in "operating" position, brings about the opening of the electronic gate arranged between winding E3 of transformer TC of connector J2 (FIG. 4) and the secondary winding of transformer TL3 (FIG. 3) of the called subscriber's line circuit.

When it shifts to "operating" position, flip-flop circuit L6—C6 (FIG. 5) causes flip-flop circuit L5—C5 to shift to "normal" position, owing to the presence of common condenser CC2. As will appear later on, when in "operating" position flip-flop circuit L5—C5 is used to block the ringing circuits so as to prevent the application of ringing current during the openings of the line while the calling subscriber is dialing. The shifting of flip-flop circuit (FIG. 5) to "operating" position causes the release of the register. As explained above, the seizure of a register by a connector is the result of the coincidence of two conditions, namely: (1) the existence of a potential of +3 volts on conductor MS20 (FIGS. 7, 8 and 9) from the register allotter and showing that the register is free and that it has been chosen to handle the next call and (2) the existence of ground potential on conductor TV2 (FIG. 5) showing that connector J2, in the example under consideration, has been seized by a calling subscriber and is hunting for a free register. When these two conditions coincide, current flows in the following circuit: conductor MS20 brought to +3 volts (FIGS. 8 and 9), diode *d*401, control winding *co*401 of the flip-flop circuit L40—C40 associated with connector J2, conductor 401 (FIGS. 9 and 8), control winding *co*40 of amplifier A20, conductor 401 (FIGS. 8 and 5), resistance 451, diode *d*133, which shows a low impedance owing to the busying of the connector, ground. When the register brings about the shifting to "operating" position of the flip-flop circuit associated with the called subscriber in the connector to which the register is connected, it causes flip-flop circuit L6—C6 to shift to "operating" position, as explained above. The output of this flip-flop circuit, point P6 (FIG. 5), which was at ground potential, switches to +5 volts (this potential being fixed by clipping diode *d*61, whose cathode is brought to +5 volts) and this potential is used to cause the release of the register. The +5-volt potential difference appears at the terminals of resistance R451 and point 71 is brought to +5 volts. Diode *d*402 (FIG. 9) in series in the guard circuit of the register connector (FIGS. 8 and 9) is then blocked because conductor 401 (FIGS. 5 and 8) is brought to +5 volts and because point 402 is held at +4 volts by diode *d*403, whose cathode is brought to +4 volts by a common biasing battery. The release of the register is then effected by the return of flip-flop circuit L20—C20 (FIG. 9) to "operating" position, as explained in connection with the case where the calling subscriber hangs up his handset.

The case where the called subscriber is busy will now be considered with reference to FIG. 14. It will be assumed, for example, that subscriber 38 is already in conversation through connector J3, in which case flip-flop circuit L3'—C3' (FIG. 4') is in "operating" position. In that case, a potential of the order of +6 volts appears at the terminals of resistance RC3', whose right-hand end is positive. Current then flows in the following circuit: right-hand end of resistance RC3' (FIG. 4') brought to +6 volts, diode *d*35', diode *ds*38 (FIG. 13), resistance *ru*8 (FIG. 12), diode *d*283 biased so as to show a low impedance. Conductor *c*30 is thus brough to +6 volts and no current can flow in winding *co*32, whose other end is connected to point P403 brought to +4 volts, diodes *d*35 (FIG. 4) and *d*408 (FIG. 9) being then blocked. The operation of the register in the case of a busy called subscriber will be explained later.

Reference will now be made to the detailed circuits shown in FIGS. 3 to 13. As has been explained, the control current of flip-flop circuit L3—C3 (FIG. 5) also passes through control winding *cod*6 of flip-flop circuit L6—C6 (FIG. 5) and causes the shifting to "operating" position, which is position 2, of the meter shown in the lower portion of FIG. 5. As soon as circuit L3—C3 shifts to "operating" position, the 6-volt potential appearing at point P32 (FIG. 4) causes current to flow in the following circuit: point P32, resistance R33, conductor 35 (FIGS. 4 and 3), diode *da*34, control winding of amplifier AL3, positive terminal brought to +1 volt. Amplifier AL3 is normally blocked by a biasing winding not shown and is designed to be unblocked by the current flowing in the circuit just described. 50-cycle alternating current is then applied to the subscriber line by means of the following circuit: generator G50, delivering 50-cycle alternating current of suitable amplitude, winding of magnetic amplifier AL3, which then shows a low impedance, condenser *c*32, upper winding of line transformer TL3, lower winding of transformer TL3, condenser *c*31, negative terminal of the 48-volt battery, whose positive terminal is grounded. This current is used to operate the ringer of the called subscriber's station. When the called subscriber removes his handset, in answer to the ringing, the transmitter current is used as already explained to bias diode *da*32, which then shows a low impedance, its cathode being then brought to a negative potential (—.5 volt for example) with respect to ground. Current then flows in the following circuit: point P32 (FIG. 4) brought to +6 volts, diode *d*34, control winding *co*31, conductor 34 (FIGS. 4 and 3), resistance R32, diode *da*32, ground. This current is of opposite direction to the transmitter current in diode *da*32, but it will be understood that resistance R32 is of such value that the guard current crossing it is substantially less than the transmitter current, so that the cathode potential of diode *da*32 is not modified substantially. The potential of point P31 (FIG. 3) is at the cathode potential of diode *da*32, namely, of the order of —.5 volt, with respect to ground, so that the same applies to point 30. Diode *da*34, whose cathode is brought to +1 volt is then blocked, causing the return of magnetic amplifier AL3 to normal and consequently stopping the sending of 50-cycle ringing current to the subscriber line. The resistance of control winding *co*31 being negligible as compared to resistance R32, conductor 34 is brought practically to +6 volts, thus busying the circuit with respect to the other connectors. The two subscribers are now connected to each other. It will be noticed that, when the subscriber removes his handset, diode *da*21 short-circuits the ringing-current source. Throughout the connection flip-flop circuit L2—C2, belonging to the calling subscriber, and flip-flop circuit L3—C3, belonging to the called subscriber, are both in "operating" position, while magnetic amplifier A11 (FIG. 5) is in "normal" position, in which it supplies an output current to bias diodes *d*201 and *d*202 so as to cause a short-circuiting of condenser CC1, common to all the flip-flop circuits shown in FIG. 4. The tristable meter shown in the lower portion of FIG. 5 is in position 2, where only flip-flop circuit L6—C6 is in "operating" position. As explained above, the left-hand secondary winding of the flip-flop circiut L2—C2 associated with the calling subscriber supplies alternating current, which is rectified by diode *d*29 and which is used as explained above to keep amplifier A12 (FIG. 5) unblocked. This guard current also flows through filtering self-inductance SF and the primary winding of a pulse transformer T. The other end of the circuit terminates at the cathode of diode *da*22 (FIG. 3), whose function has already been explained. There is a similar circuit in the case of flip-flop circuit L3—C3, associated with the called subscriber. This circuit is common with that of the calling subscriber for the control of amplifier A12 (FIG. 5) and the primary winding of pulse transformer T. Its other end terminates at the cathode of diode *da*32, which shows a low impedance so long as the called subscriber does not replace his handset. As soon as either of the subscribers hangs up, the sudden diminution of the current in the primary winding of transformer T (FIG. 5) causes the appearance of a negative pulse at the left-hand terminal of the secondary winding of transformer T, the other end of which is held at +4.5 volts by a biasing battery. This negative pulse is applied through diode *d73* to the control winding *cod7* of flip-flop circuit L7—C7, which then shifts to "operating" position and, owing to the presence of common condenser CC2, causes the return to "normal" of flip-flop circuit L6—C6. The +6-volt potential appearing at the terminals of resistance R71 replaces the 6-volt potential previously supplied by flip-flop circuit L6—C6, in order to keep point 71 at 6 volts, through diode *d74*, and consequently busies the connector with respect to the registers. This potential is also applied, through resistance R72, to one of the ends of the control winding *co132* of flip-flop circuit L13—C13, the other end of which is grounded. Flip-flop circuit L13—C13 then shifts to "operating" position. Its output potential is further used to block diode *d133* and to bring conductor TV2 to a potential of the order of 5 volts, which characterizes the availability of the connector with respect to the allotter of FIG. 6. Further, the output current is used to block amplifier A11 and, consequently, to remove the short-circuit at the terminals of common condenser CC1. As soon as the short-circuit is removed, flip-flop circuits L2—C2 and L3—C3, which are in "operating" position, return to "normal." The output current of flip-flop circuit L13—C13 also flows through the control winding *cod5* of flip-flop circuit L5—C5, which constitutes the first stage of the meter shown in the lower portion of FIG. 5. The return of flip-flop circuit L5—C5 to "operating" position returns flip-flop circuit L7—C7 to "normal" position, so that the connector is ready to handle another call.

As has been explained, the connector is released upon the hanging up of the calling or the called subscriber. Two cases can then arise. In one case, the other subscriber hangs up immediately, so that the automatic switchboard is fully released as regards that call. If the other subscriber does not hang up immediately, he is again marked calling and is taken care of by the connector that has been marked by the allotter of FIG. 6. As will later be explained, he is sent busy tone after a predetermined time interval to tell him that he must replace his handset.

As has been explained above, ringing current is sent to a subscriber station when two conditions obtain, namely: (1) the subscriber station's handset is on the hook, which is shown to the exchange by the fact that a diode such as *da32* shows a high impedance, and (2) the flip-flop circuit associated with the particular subscriber line circuit involved is in "operating" position, which, as regards ringing, is characterized by the fact that conductor 35 (FIGS. 4 and 3) is brought to +1 volt. It is easy to see that these conditions occur in the case of a calling subscriber at each opening of the line during dialing. A circuit blocking the ringer during dialing has been provided to prevent a calling subscriber's ringer from ringing at each opening of the line caused by the dial. As explained above, flip-flop circuit L5—C5 (FIG. 5) is in "operating" position during dialing. Diode *d51*, which is normally blocked because its cathode is connected by resistance R51 and coil SF to the positive terminal of a 4-volt biasing battery, is unblocked owing to the fact that circuit L5—C5 is in "operating" position and it then shows a low impedance. Diode *d51* is connected by conductor 44 (FIGS. 5 and 4) to the cathode of diodes *d38*, *d28* and *d18* (FIG. 4), respectively associated with the subscriber station ringing circuits. Under these conditions, and referring for example to the case where subscriber PA2 is dialing, point P22 is brought to +6 volts but diode *d28* shows a low impedance, so that conductor 25 is brought practically to ground potential. Of course, the value of resistance R28 is so chosen as to limit the current to a sufficiently low value so that the cathode potential of diode *d51* (FIG. 5) will not be modified substantially. Diode *da24* is then blocked, along with magnetic amplifier AL2, so that the 50-cycle alternating current cannot be sent to the calling subscriber's station at each opening of the line by the dial.

An explanation will now be given of how the sending of busy tone to the calling subscriber from the register (FIGS. 10 to 13) is controlled, either when the called subscriber is busy or when the calling subscriber has not completed dialing a predetermined time interval after he has been connected to the register. As will appear later on, the sending of busy tone causes the release of the register. As has been explained, the register (FIGS. 10 to 13) comprises a timing circuit made up of a pulse generator GI (FIG. 10) and of a meter CM having four stable conditions (FIG. 10). The pulse generator supplies pulses every 8 seconds and these pulses are applied simultaneously to the control windings of the flip-flop circuits of stages 1, 2 and 3 of meter CM. Meter CM comprises, in addition, a stage corresponding to the "normal" position, this stage being blocked in "operating" position by means of a circuit already described so long as the register has not been connected to a connector.

As soon as the register (FIGS. 8 to 13) is connected to a connector that has been seized by a calling subscriber receives dialing tone and meter CM shifts to position 1 as soon as it receives a pulse supplied by generator GI, so that it will reach position 3 after a time interval of 16 to 24 seconds, depending on whether the register is unblocked immediately before or after an output pulse from generator GI. Further, the flip-flop circuit L600—C600 of the third stage of meter CM comprises a supplementary control winding (*cod600*) in series with a circuit element (ER) (FIG. 11) designed to introduce a delay of the order of a few milliseconds. Diode *d620* is connected in parallel to element ER and control winding *cod600*, its anode being connected to the cathode of diode *d202* through diode *d630* and resistance R630, which limits the control current. As explained above, the cathode of diode *d202* is brought to a negative potential close to ground potential (—.5 volt for example) until the register has received from the calling subscriber the second digit in the called subscriber's number. Under these conditions, diode *d630* is blocked and no current flows through control winding *cod630*.

In the embodiment example under consideration, circuit element ER, which introduces a delay of the order of a few milliseconds, consists of a magnetic core in the form of a tore having a rectangular hysteresis cycle. Two windings (*er1* and *er2*) are provided on this tore. Winding *er1* is in series with conductor LA (FIGS. 11 and 10) and control winding *cod600*, while winding *er2* is crossed by biasing current obtained from source PO, designed so that the magnetic core will be saturated in one direction when the circuit is in normal.

As has been explained with reference to the establishment of a connection when the register has received the called subscriber's number, amplifier A20 (FIG. 11) is blocked and the cathode of diode *d202* is brought to +4 volts; current then flows in the following circuit: cathode of diode *d202* brought to +4 volts, resistance R630, diode *d630*, diode *d620*, ground. A potential of +.5 volt with respect to ground then appears at the anode of diode *d620*. The value of this potential is here a function of the voltage drop in diode *d620*, but a suitable biasing source could be introduced between the cathode of diode *d620* and ground, so as to bring the anode of diode *d620* to a higher potential, 1 volt or 1.5 volt for example, when the cathode of diode *d202* is brought to +4 volts. The current that builds up in winding *er1*, conductor LA (FIGS. 11 and 10) and the control winding of flip-flop circuit L600—C600 (FIG. 10) is equal to the magnetizing current and remains at this value during a time interval that depends upon the characteristics of magnetic circuit ER and winding *er1* and upon the potential applied, as is well known. In the embodiment example under consideration it is assumed that this current is insufficient to bring about the shifting in position of flip-flop circuit L600—C600 and that the current remains at that value during a few milliseconds. At the end of that time interval the impedance shown by winding *er1* becomes negligible and the value of the current in the control winding is limited only by the resistance of the circuit in series with that winding. The circuit is designed so that this current will then be sufficient to shift flip-flop circuit L600—C600 to "operating" position and consequently to return to "normal" the particular one of the other flip-flop circuits of meter CM that was in "operating" position.

Now will be considered the various cases that can arise. If the calling subscriber dials normally, the register receives the two digits of the called subscriber's number before the end of 16 seconds, the minimum time required for meter CM to reach position 3 when stepped by the output pulses of generator GI; amplifier A20 is blocked as soon as pulse-train meter CT reaches position 2 and a 4-volt potential appears at the cathode of diode *d202* to control the establishment of the connection. Two cases should then be considered. If the called subscriber is free, the flip-flop circuit associated with him in a connector such as J2 (FIG. 6) used for establishing the connection is placed in "operating" position and the register is released before flip-flop circuit L600—C600 (FIG. 11) is placed in "operating" position. If the called subscriber is busy, the register is not released immediately and meter CM (FIG. 10) shifts to position 3 after a delay determined by circuit ER (FIG. 11). As will later be explained, this shifting of meter CM to position 3 causes the sending of busy tone to the calling subscriber and the release of the register.

If the calling subscriber fails to dial or if he does not dial the full number, that is to say, if pulse-train meter CT (FIG. 11) does not reach position 2, the connection between the register and the calling subscriber is held until meter CM (FIG. 10) reaches position 3, that is to say, for a time interval comprised between 16 and 24 seconds, depending upon the case. As soon as flip-flop circuit L600—C600 shifts to "operating" position, the cathode of diode *d601* (FIG. 10), which was held at +6 volts, takes a potential slightly negative with respect to ground (—.5 volt for example), as explained in connection with the operation of meter CT (FIG. 11). This negative potential close to ground is used, through conductor LB (FIGS. 10 and 11) and decoupling diode *dc2*, to block amplifier A20 (FIG. 11). It then takes the place of the potential obtained from the cathode of diode *d903* in the case where the subscriber has dialed the two digits of the called party's number. The potentials that appear following the blocking of amplifier A20 are obviously the same as those obtained in the case of the establishment of a normal connection between two subscribers, but only the potential on the cathode of diode *d202* is used to bring the potential of point P403 (FIG. 9) to +4 volts. Current then flows in the following circuit: point P403 (FIG. 9) brought to +4 volts as explained with reference to the normal establishment of a connection between the calling and the called subscribers, diode *d408*, conductor 407 (FIGS. 9, 8 and 5), control winding *cod6* of flip-flop circuit L6—C6, conductor 46 (FIGS. 5 and 4), diode *d46*, control winding *co42* of flip-flop circuit L4—C4, conductor *c40* (FIGS.. 4 and 7), cable CA1 (FIGS. 7, 8, 9, 10 and 13), conductor C40, diode *ds40*, resistance *rs40*, conductor CO (FIGS. 13 and 10), cathode of diode *d601* brought to a negative potential close to ground potential (—.5 volt for example). This current shifts flip-flop circuits L4—C4 and L6—C6 to "operating" position. As has been explained, the shifting of flip-flop circuit L6—C6 to "operating" position releases the register. The shifting of flip-flop circuit L4—C4 to "operating" position opens the electronic gate comprising the secondary winding of transformer TTI (FIG. 4), winding E4 of transformer TC of connector J2 and diodes *d41* and *d42*. The busy tone, which in such a system is also intended to ask the calling subscribed to hang up and start dialing again, is applied by generator TI to the primary winding of transformer TTI and is sent to the calling subscriber through connector transformer TC (FIG. 4). The connector is released when the calling subscriber replaces his handset.

The circuit used to shape the dial pulses and to detect pulse trains will now be described. As previously explained, the pulses are received by means of two flip-flop circuits, L31—C31 and L32—C32 (FIG. 10), the circuit arrangement being such that flip-flop circuit L31—C31 is in "operating" position while the subscriber line is closed, while flip-flop circuit L32—C32 is in "operating" position while the line is open, that is to say, during the dial pulses. In the case of flip-flop circuit L31—C31 the output current of transformer TS31 is rectified by diodes *dr31* and filtered by coil SF31 and condenser C311. Components TS32, *dr32*, SF32 and C321 perform, respectively, the same function with respect to flip-flop circuit L32—C32. Diodes *d311* and *d321*, whose cathodes are connected to the positive terminal of a 4-volt biasing battery, limit to this value the potentials of points P311 and P321 when the corresponding flip-flop circuits, L31—C31 and L32—C32, respectively, are in "operating" position. Diodes *d312* and *d322* are the decoupling diodes. The two windings TO11 and TO12, mounted on rectangular-hysteresis-cycle toroidal magnetic core TO1, are respectively supplied by flip-flop circuits L31—C31 and L32—C32. These two windings TO11 and TO12 are wound in opposite direction. The potentials appearing at points P311 and P321 agree with the signals sent by the subscriber by means of the dial. Consequently, point P321 is brought to +4 volts at each opening of the line for 60 milliseconds and point P311 is brought to +4 volts at each closing of the line, or for 40 milliseconds if it is a question of an interval between pulses and for at least 500 milliseconds if an interval between two pulse-trains is involved. Winding TO11 is designed so that the shifting from one saturation condition to the other, when brought about by means of this winding, will last 50 milliseconds, or substantially longer than the control signal corresponding to an interval between two pulses. Winding TO12 is designed so that the shifting from one saturation condition to the other, when brought about by means of this winding, will last 30 milliseconds, or less than the length of a dial pulse. The operation is then as follows. At the time a connection is established between the register and the calling subscriber, magnetic core TO1 is in a first magnetic condition, "A" for example, owing to the fact that flip-flop circuit L31—C31 is in "operating" position. The first dial-pulse shifts flip-flop circuit L32—C32 to "operating" position and returns flip-flop circuit L31—C31 to "normal." Magnetic core TO1 then shifts to a second saturation condition, "B." The current flowing through winding TO12 is equal to the magnetizing current for 30 milliseconds, then takes a substantially higher value (for example 10 times the value of the magnetizing current) for the last 30 milliseconds. Magnetic core TO1 does not have time to resume its first saturation condition, "A," during the interval between the first pulse and the next, because the control signal lasts only 40 milliseconds. In this case, the current in winding TO11 does not exceed the value of the magnetizing current. If the signal applied to winding TO11 corresponds to an interval between two pulse-trains, that is to say, if, in the case under consideration, the first train comprises only one pulse, this signal lasts at least 300 milliseconds, so that magnetic core TO1 shifts to its second saturation condition, "B," and the current in winding TO11 takes in turn a value substantially higher than that of the magnetizing current, six times that value for example. If it is assumed that the threshold of the devices using the currents appearing in windings TO11 and TO12 is such that the magnetizing current for these two windings of magnetic core TO1 has no effect, there is a current pulse in winding TO12 for each dial pulse and a current pulse in winding TO11 for each interval between two pulse-trains. These current pulses are respectively applied to control windings CO5 and CO6, which are respectively mounted on rectangular-hysteresis-cycle toroidal magnetic cores TO6 and TO5. These two cores are normally placed in a predetermined magnetic-saturation condition, which will be designated "A," for example, by means of biasing windings EP6 and EP5, supplied from a D.C. source that, in the embodiment example under consideration, supplies a 4-volt potential. The letter "B" will be used to designate the other magnetic-saturation condition of cores TO6 and TO5. Windings CO6 and CO5, which are connected in series with windings TO11 and TO12, respectively, are designed so that the magnetizing current for magnetic cores CO6 and CO7 will be higher than the magnetizing current in windings TO11 and TO12 of magnetic core TO1, the operating threshold mentioned above being thus obtained. The two circuits associated with magnetic cores TO6 and TO5 operate the same way and their purpose is to supply a short pulse of great amplitude from the signal applied. Only the operation of the circuit associated with magnetic core TO5 will be described.

The windings mounted on magnetic core TO5 are designed so that the shifting from saturation condition "A" to saturation condition "B," when such shifting is brought about by means of winding CO5, crossed by the output current of winding TO12, will require a time interval at most equal to but preferably shorter than the length of the output pulse of winding TO12. Under these conditions, when an output pulse from winding TO12 corresponding to a dial pulse, as has been explained above, is applied to winding CO5, it causes magnetic core TO5 to shift to saturation condition "B." The two windings CO5 and ES5, mounted on core TO5, form a transformer and, during the shifting from saturation condition "A" to saturation condition "B," condenser CE5 charges, slowly, in series with resistance RO5, whose value is low as compared to the impedance shown by winding ES5. When saturation condition "B" is reached, the transformation effect practically ceases and winding ES5 shows a very low impedance. Condenser CE5 then discharges very quickly, the discharge current being limited only by resistance RO5. The pulse thus appearing at the terminals of resistance RO5 is applied to conductor IR. When the control current ceases, the biasing winding replaces the magnetic core in saturation condition "A." The pulse appearing at the terminals of resistance RO5 when magnetic core TO5 returns to saturation condition "A" has no effect upon the metering circuits (FIGS. 10 and 11), owing to the fact that it is of opposite polarity with respect to the pulse appearing upon the shifting from saturation condition "A" to saturation condition "B" and that the control circuits of the meters comprise a diode in series. The circuit associated with magnetic core TO6 operates the same way as regards dial pulses.

While this invention has been described with reference to a particular embodiment example of a private automatic switchboard comprising a small number of subscriber lines, it is obvious that it is not limited to said example and that it is capable of variants and modifications without departing from its scope.

We claim:

1. An automatic telephone switching system comprising lines, connectors and registers for extending telephone connections between any calling one of said lines and any desired called one of said lines, line circuits for respective lines each including an electronic gate operable to connect the associated line to any of said connectors, each connector including an electronic gate operable to connect the associated connector to any register, said connectors and said registers each including a flip-flop circuit having a first and a second stable state, a connector allotter for selecting one of said connectors and causing its flip-flop circuit to assume its said first stable state and all other connector flip-flop circuits to assume their said second state, means in the said selected connector for preparing the electronic gate of each line circuit for operation, a register allotter for causing the flip-flop circuit of a selected one of said registers to assume its first stable state and all other register flip-flop circuits to assume their said second state, means in the said selected register for preparing the electronic gate of each connector circuit for operation, means responsive to the calling condition on any calling line for operating the prepared gate in the associated line circuit to connect the calling line to the selected connector, means in the selected connector for operating its prepared gate to connect the calling line to the selected register, and means responsive to signals received from the calling line indicative of a desired called line for controlling the selected connector to make connection with the said desired called line.

2. In an automatic telephone switching system according to claim 1, the said means in the selected connector for preparing the electronic gate of each line circuit for operation including a connector lockout circuit associated with all of said line circuit gates, means responsive to the said operation of the gate associated with the calling line for controlling the lockout circuit to disable all unoperated prepared line circuit gates to preclude the connection of more than one line circuit with the selected connector at any one time.

3. An automatic telephone switching system as set forth in claim 2 wherein the said means for controlling the selected connector to make connection with the desired called line includes means for modifying the said connector lockout circuit from monostage operation to bistage operation and includes means for controlling the said connector lockout circuit to operate the gate associated with the said desired called line.

4. In an automatic telephone switching circuit as set forth in claim 3, a ringing tone generator common to all of said lines, a normally blocked gate in series with said generator, means responsive to the said operation of the called line gate for opening said normally blocked gate to transmit ringing current over the called line, and means responsive to answer by the called line for disabling the said gate operating means.

5. An automatic telephone switching system according to claim 2 wherein the said connector lockout circuit includes $n+1$ line stages where $n$ is the number of lines, each line stage having a first and a second stable condition, and wherein the said lockout circuit controlling means initially controls the $n+1$ stages to prevent more than one line stage assuming the same stable condition at any one time.

6. In an automatic telephone switching system according to claim 1, the said means in the selected register for preparing the electronic gates of each connector circuit for operation including a register lockout circuit associated with all of said connector gates, means responsive to the said operation of the connector gate for controlling the lockout circuit to disable all unoperated prepared connector gates to preclude the connection of more than one connector to the said selected register at any one time.

7. An automatic telephone switching system according to claim 6, wherein the said register lockout circuit includes $p+1$ connector stages where $p$ is the number of connectors, each connector stage having a first and a second stable condition, and wherein the said register lockout circuit controlling means controls the $p+1$ stages to prevent more than one stage assuming the same stable condition at any one time.

8. An automatic telephone switching system according to claim 1 wherein the said connector allotter comprises a separate two-state flip-flop circuit for each connector, with one allotter flip-flop circuit assuming a first state and all others assuming the second state, each allotter flip-flop circuit including a separate electronic gate which when unblocked changes the state of its flip-flop circuit from the first state to the second state and changes the state of the next succeeding flip-flop circuit from the second state to the first state, to thereby cause cyclic operation of the flip-flop circuits when all gates are unblocked, means in each connector connected to a calling line for unblocking its associated allotter gate and means in each connector not connected to a calling line for blocking its associated gate, and means responsive to a blocked gate for preventing the said cyclic operation beyond the blocked gate to effect the said connector selection.

9. An automatic telephone switching system according to claim 1 wherein the said register allotter comprises a separate two-state flip-flop circuit for each register, with one register allotter flip-flop circuit assuming a first state and all others assuming the second state, each register allotter flip-flop circuit including a separate electronic gate which when unblocked changes the state of its flip-flop circuit from the first state to the second state and changes the state of the next succeeding flip-flop circuit from the second state to the first state, to thereby cause cyclic operation of the register allotter flip-flop circuits when all gates are unblocked, means in each register connected to a connector for unblocking its associated register allotter gate and means in each register not connected to a connector for blocking its associated gate, and means responsive to a blocked gate for preventing the said cyclic operation beyond the blocked gate to effect the said register selection.

References Cited in the file of this patent

UNITED STATES PATENTS

| | | |
|---|---|---|
| 2,688,661 | Van Mierlo | Sept. 7, 1954 |
| 2,721,947 | Isborn | Oct. 25, 1955 |
| 2,769,865 | Faulkner | Nov. 6, 1956 |
| 2,775,713 | Isborn | Dec. 25, 1956 |